(12) United States Patent
Daghistani

(10) Patent No.: US 11,965,996 B2
(45) Date of Patent: Apr. 23, 2024

(54) GENERATING LOW FREQUENCY MODELS FOR SEISMIC WAVEFORM INVERSION IN FORMATION REGIONS WITH LIMITED CONTROL WELLS

(71) Applicant: Saudi Arabian Oil Company, Dhahran (SA)

(72) Inventor: Ahmed W. Daghistani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 160 days.

(21) Appl. No.: 17/682,284

(22) Filed: Feb. 28, 2022

(65) Prior Publication Data

US 2023/0273332 A1    Aug. 31, 2023

(51) Int. Cl.
*G01V 1/28* (2006.01)
*G01V 1/30* (2006.01)

(52) U.S. Cl.
CPC .............. *G01V 1/282* (2013.01); *G01V 1/306* (2013.01); *G01V 2210/6169* (2013.01)

(58) Field of Classification Search
CPC . G01V 1/282; G01V 1/306; G01V 2210/6169
See application file for complete search history.

(56) References Cited

U.S. PATENT DOCUMENTS

| | | | |
|---|---|---|---|
| 8,923,094 B2 * | 12/2014 | Jing | G01V 11/00 703/2 |
| 10,802,171 B2 | 10/2020 | Meek | |
| 11,105,943 B2 | 8/2021 | Chen et al. | |
| 11,255,995 B2 * | 2/2022 | Hu | G01V 1/282 |
| 11,448,784 B2 * | 9/2022 | Yoo | G01V 1/282 |
| 11,592,587 B2 * | 2/2023 | Liu | G01V 1/303 |

OTHER PUBLICATIONS

Hansen et al., "Attribute-guided well-log interpolation applied to low-frequency impedance estimation," Geophysics, Nov. 2008, 73(6):R83-R95, 13 pages.
Kumar et al., "Low frequency modeling and its impact on seismic inversion data," 9th Biennial International Conference & Exposition on Peteroleum Geophysics, 2012, 7 pages.
Ovcharenko et al., "Deep learning for low-frequency extrapolation from multioffset seismic data," Geophysics, Nov. 2019, 84(6):R989-R1001, 13 pages.
(Continued)

*Primary Examiner* — Elias Desta
(74) *Attorney, Agent, or Firm* — Fish & Richardson P.C.

(57) ABSTRACT

The systems and methods described in this specification relate to generating a low frequency model of a subterranean formation for performing a seismic inversion. The systems and methods receive seismic data for a first region of the subterranean formation and well log data of one or more wells located at the first region. The systems and methods determine one or more relative layer attributes of the first region, one or more first input values for a machine learning model, and one or more second input values for the machine learning model. The systems and methods generate, a first relative low frequency model for the first region, and extrapolate, by executing the machine learning model by the processor, the first relative low frequency model to a second region of the subterranean formation.

20 Claims, 14 Drawing Sheets

(56) References Cited

OTHER PUBLICATIONS

Ovcharenko et al., "Neural network based low-frequency data extrapolatio," 3rd SEG FWI workshop: What are we getting, Dec. 2017, 4 pages.

Pedersen-Tatalovic et al., "Event-based low-frequency impedance modeling using well logs and seismic attributes," The Leading Edge, May 2008, 27(5):592-603, 8 pages.

Pendrel, "Low frequency models for seismic inversions strategies for success," SEG New Orleans Annual Meeting, 2015, 5624, 5 pages.

Sarhan, "The efficiency of seismic attributes to differentiate between massive and non-massive carbonate successions for hydrocarbon exploration activity," NRIAG Journal of Astronomy and Geophysics, May 2017, 6(2):311-325, 15 pages.

Scarponi et al., "New gravity data and 3-D density model constraints on the Ivrea Geophysical Body (Western Alps)," Geophysical Journal International, May 2020, 222(3):1977-1991, 41 pages.

Singh et al., "Generation of pseudo-log volumes from 3D seismic multi-attributes using neural networks: A case study," 5th Conference & Exposition on Petroleum Geophysics, 2004, 541-549, 9 pages.

Sun et al., "Extrapolated full waveform inversion with deep learning," Apr. 2019, 30 pages.

Sun et al., "Low frequency extrapolation with deep learning," SEG Technical Program Expanded Abstracts, Oct. 2018, 2011-2015, 5 pages.

\* cited by examiner

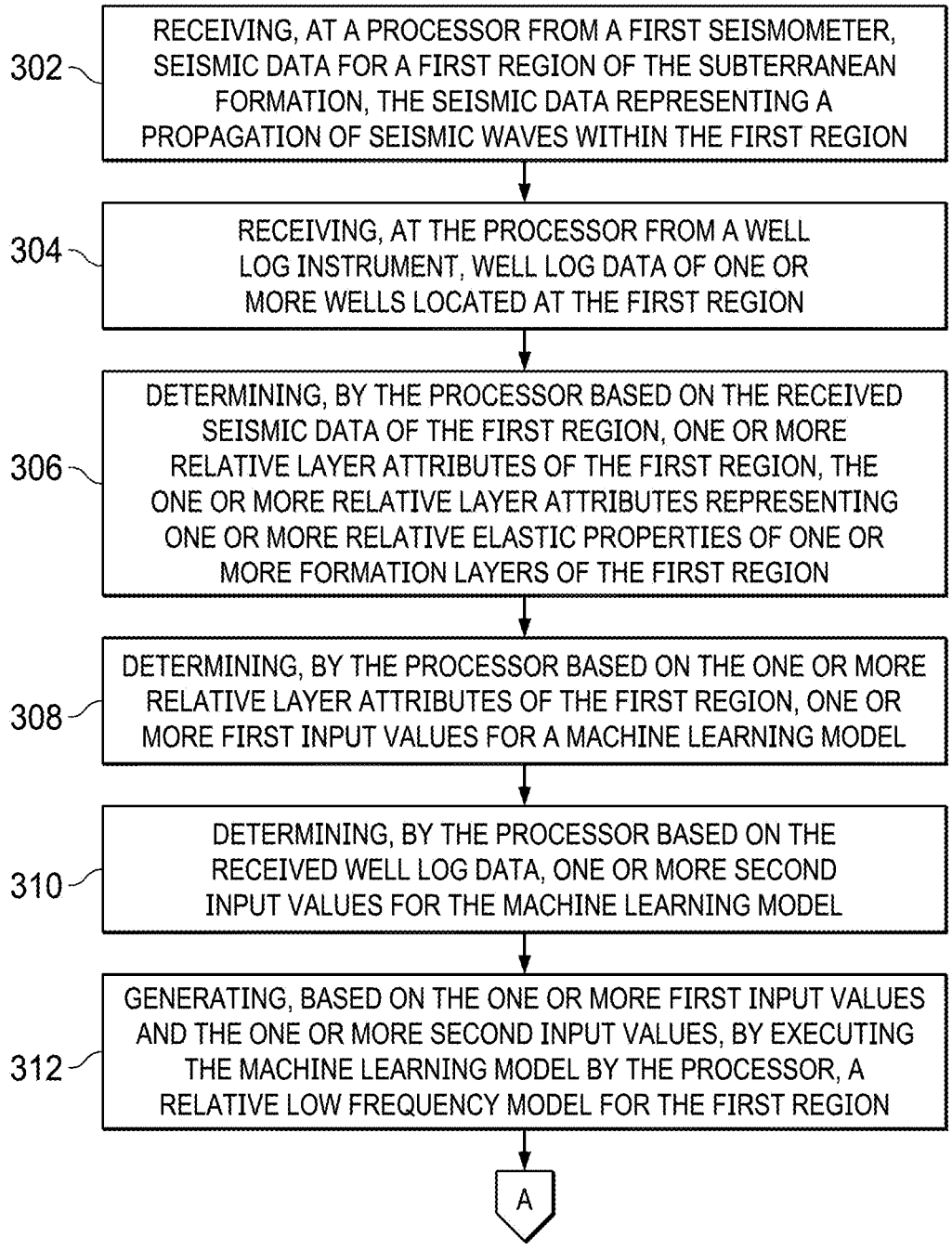

GENERATING LOW FREQUENCY MODELS FOR SEISMIC WAVEFORM INVERSION IN FORMATION REGIONS WITH LIMITED CONTROL WELLS

TECHNICAL FIELD

The present specification describes systems and methods for generating low frequency models for seismic waveform inversion in formation regions with limited control wells (for example, without any control wells).

BACKGROUND

Geophysicists often perform seismic surveys to gather data about the geology of an oil or gas field. These surveys record sound waves which have traveled through the layers of rock and fluid in the earth. Because of its efficiency and quality, many geophysicists use seismic inversion to increase the resolution and reliability of the seismic data and to improve estimation of rock properties within the earth.

In some cases, the seismic data is lacking sufficient low frequency data for seismic inversion to produce accurate representations of the layers of rock within the early. Integration of low frequency model during seismic inversion can improve the qualitative and quantitative interpretation levels of seismic inversion results.

SUMMARY

The systems and methods described in this specification use a machine learning model to generate low frequency models for seismic inversion based on seismic data and well log data. The low frequency models are first generated for regions with control wells and extrapolated to regions without control wells. The extrapolated low frequency model is generated by executing a machine learning model. The low frequency model is generated based on seismic data of the second region in combination with the low frequency model of the first region and does not require that the second region have control wells. The extrapolation process is recursively repeated until the low frequency model spans all desired regions. As an example, the Rub' al Khali section of the Arabian Desert has a limited number of control wells. This lack of control wells can create uncertainty in the seismic inversion process because it is difficult to scale the relative elastic properties of low frequency models when limited control wells are present and/or when limited well log data is available. In this example, the systems and methods described in this specification are configured for generating a low frequency model of the Rub' al Khali section of the Arabian Desert with an increased accuracy compared to previous approaches (e.g., approaches where the low frequency models use co-kriging methods to extrapolate data between wells).

The systems and methods described in this specification generate low frequency models that span very large regions, such as the entire Kingdom of Saudi Arabia (KSA). When used in a seismic inversion process, the increased accuracy of these low frequency models results in an increased accuracy for determining the inverted elastic properties of each formation layer spanning the domain of the low frequency model.

Some systems and methods for generating a low frequency model of a subterranean formation for performing a seismic waveform inversion include one or more of the following features. Some systems and methods include a first seismometer operable to measure seismic data of a first region of the subterranean formation, where the seismic data represents a propagation of seismic waves within the first region. Some systems and methods include a well log instrument operable to measure well log data of one or more wells located at the first region. Some systems and methods include a non-transitory computer-readable medium storing instructions that, when executed by a processor of the computer, cause the processor to perform one or more of the following operations.

In some implementations, the operations include receiving, at a processor from a first seismometer, seismic data for a first region of the subterranean formation, the seismic data representing a propagation of seismic waves within the first region. In some implementations, the operations include receiving, at the processor from a well log instrument, well log data of one or more wells located at the first region. In some implementations, the operations include determining, by the processor based on the received seismic data of the first region, one or more relative layer attributes of the first region, the one or more relative layer attributes representing one or more relative elastic properties of one or more formation layers of the first region. In some implementations, the operations include determining, by the processor based on the one or more relative layer attributes of the first region, one or more first input values for a machine learning model.

In some implementations, the operations include determining, by the processor based on the received well log data, one or more second input values for the machine learning model. In some implementations, the operations include generating, based on the one or more first input values and the one or more second input values, by executing the machine learning model by the processor, a relative low frequency model for the first region. In some implementations, the operations include extrapolating, by executing the machine learning model by the processor, the first relative low frequency model to a second region of the subterranean formation, the second region being distinct from the first region.

In some implementations, the operations include updating, based on the extrapolating, by executing the machine learning model by the processor, the relative low frequency model to span the first region and the second region. In some implementations, the operations include scaling, by the processor based on the well log data of the first region, the relative low frequency model. In some implementations, the operations include generating, by the processor based on the scaling, a scaled low frequency model representing one or more scaled elastic properties of the one or more formation layers of the first region and one or more formation layers of the second region. In some implementations, the operations include performing, by the processor based on the scaled low frequency model, the seismic waveform inversion.

In some implementations, extrapolating the relative low frequency model to the second region includes recursively extrapolating the relative low frequency model to one or more additional regions of the subterranean formation. In some cases, updating the relative low frequency model to span the first region and the second region includes recursively updating, based on the recursive extrapolation, the relative low frequency model to span the first region, the second region, and the one or more additional regions.

In some implementations, the operations include receiving, at the processor from a second seismometer, seismic data of the second region, the seismic data representing a propagation of seismic waves within the second region. In some cases, the operations include determining, by the processor based on the received seismic data of the second region, one or more relative layer attributes of the second region, the one or more relative layer attributes of the second region representing one or more relative elastic properties of the one or more formation layers of the second region. In some cases, the operations include determining, by the processor based on the one or more relative layer attributes of the second region, one or more third input values for the machine learning model.

In some implementations, updating the relative low frequency model to span the first region and the second region comprises updating, based on the relative low frequency model and the one or more third input values, by executing the machine learning model by the processor, the relative low frequency model to span the first region and the second region. In some cases, the second region is void of wells.

In some implementations, determining the one or more relative layer attributes of the first region includes transforming, by the processor, the seismic data of the first region by a −90 degree phase shift prior to determining the one or more relative layer attributes.

In some cases, the scaled low frequency model represents at least one of a density, a velocity, and an impedance for the one or more formation layers of the first region and the one or more formation layers of the second region.

In some implementations, updating the relative low frequency model to span the first region and the second region includes updating the second relative low frequency model to span the first region and the second region in entirety.

In some implementations, the operations include determining, by the processor based on the seismic inversion, one or more well sites.

In some implementations, the systems and methods include measuring, by the second seismometer, the seismic data of the second region. In some cases, the machine learning model is independent of well log data from the second region.

In some implementations, the systems and method include measuring, by the first seismometer, the seismic data at the first region and measuring, by the well log instrument, the well log data at the first region.

In some implementations, the systems and methods include a drill, controlled by the processor, to drill one or more wellbores at each of the one or more well sites.

In some implementations, the systems and methods include a pump, controlled by the processor, to extract hydrocarbons from the one or more wellbores at the one or more well sites.

The systems and methods described in this specification provide various advantages.

Improving the accuracy of the inverted elastic properties of each formation layer aids exploration efforts by guiding the placement of exploration wells to regions with favorable the inverted elastic properties and/or favorable chances of discovering hydrocarbon.

By determining a low frequency model for a region with control wells, the systems and methods described in this specification use both seismic data and well log data of the control wells to increase the accuracy of the low frequency model in the region with control wells.

By extrapolating the low frequency model to an adjacent region without control wells, the systems and methods described in this specification use the seismic data from the region without control wells in combination with the previously generated low frequency model to increase the accuracy of the extrapolated low frequency model in the region without control wells.

By extrapolating the low frequency models prior to scaling the relative elastic properties from the seismic data, the systems and methods described in this specification reduce bias and uncertainty in the extrapolated low frequency models.

By recursively extrapolating the low frequency model to span larger and larger areas, the systems and methods described in this specification provide a reliable way to generate very large low frequency models.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIGS. 13A and 13B represent a flowchart of a method for generating a low frequency model of a subterranean formation.

Like reference symbols in the various drawings indicate like elements.

DETAILED DESCRIPTION

The systems and methods described in this specification use a machine learning model to generate low frequency models for seismic inversion based on seismic data and well log data. The low frequency models are first generated for regions with control wells and extrapolated to regions without control wells. A computer system executes a machine learning model to generate an extrapolated low frequency model. The computer system executes the machine learning model using seismic data of the second region in combination with the low frequency model of the first region and does not require that the second region have control wells.

The computer system repeats the extrapolation recursively until the low frequency model spans all desired regions.

Figure 1:
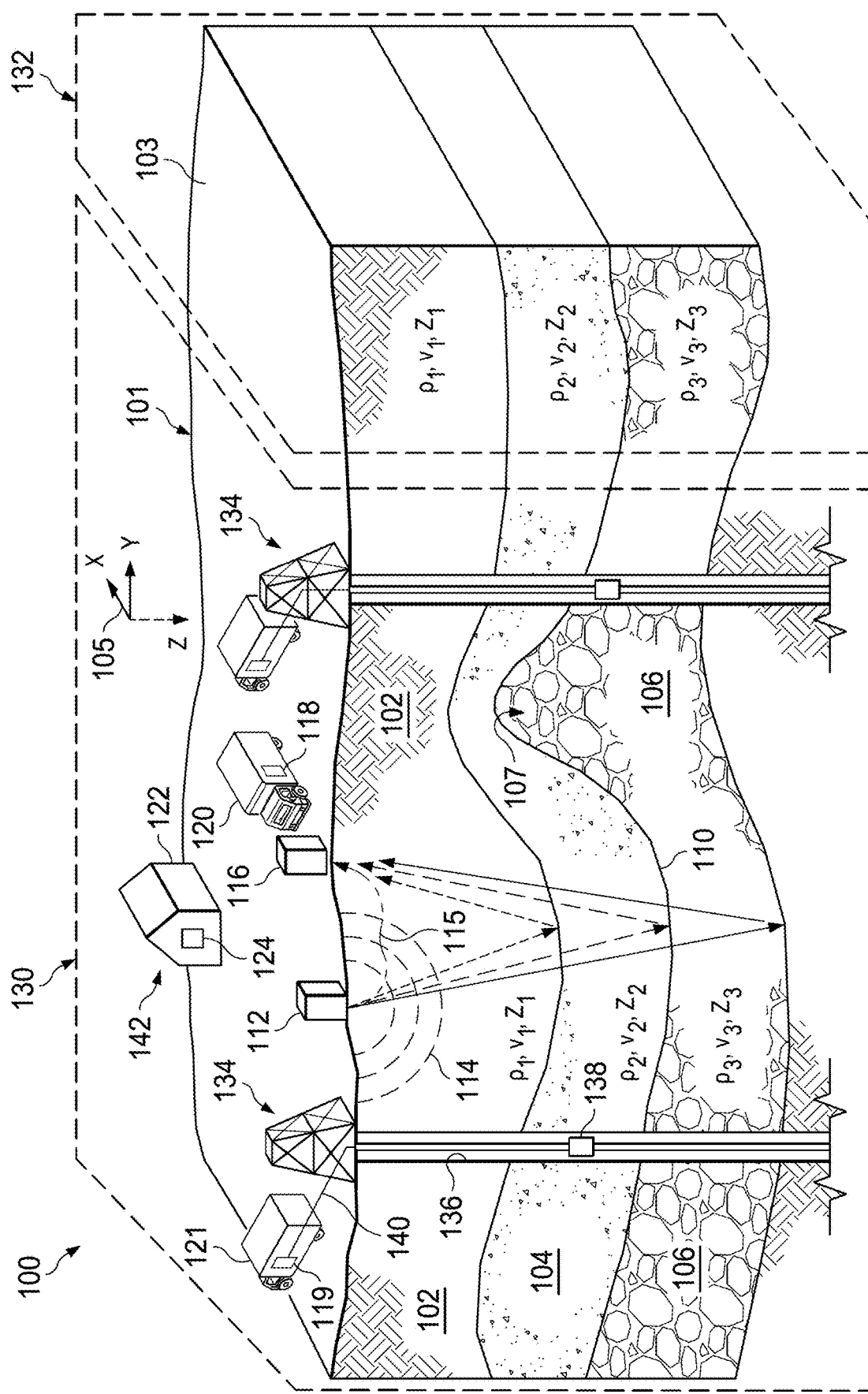
FIG. 1 is an illustration of a wellbore system.

FIG. 1 is an illustration of a wellbore system 100. The wellbore system 100 includes subterranean formation 101 having a ground surface 103 and one or more formation layers 102, 104, 106. The subterranean formation 101 is divided into two distinct regions—a first region 130 and a second region 132. The first region 130 includes one or more wells 134 while the second region 132 does not include any wells.

Each of the formation layers 102, 104, 106 have different elastic properties (for example, phase velocities (v), densities (φ, and/or impedances (Z)). In some examples, the elastic properties vary spatially (for example, along the x, y, and/or z directions of a coordinate system 105). In the example shown, formation layer 102 includes rock having a phase velocity ($v_1$), a density ($\rho_1$), and an impedance ($Z_1$); formation layer 104 includes rock having a phase velocity ($v_2$), a density ($\rho_2$), and an impedance ($Z_2$); and formation layer 106 includes rock having a phase velocity ($v_3$), a density ($\rho_3$), and an impedance ($Z_3$). While only three formation layers 102, 104, and 106 are represented in FIG. 1, some subterranean formations 101 include more than three formation layers.

The rock that makes up the layers 102, 104, and 106 can be either permeability or impermeable rock. Oil and gas tend to rise through permeable reservoir rock until further upward migration is blocked, for example, by a layer of impermeable cap rock 102. For example, FIG. 1 shows an anticline trap 107, where the layer of impermeable cap rock 102 has an upward convex configuration. In some examples, oil and gas is trapped in the anticline trap 107 and seismic surveys are used to identify such locations.

In particular, seismic surveys identify locations where interaction between layers of the subterranean formation 101 are likely to trap oil and gas by limiting this upward migration. As shown in FIG. 1, a seismic survey is being performed to map subterranean features such as facies, faults, and traps in the subterranean formation 101. A seismic source 112 (for example, a seismic vibrator or an explosion) generates seismic waves 114, 115 that propagate through the subterranean formation 101 and into the earth. Although illustrated as a single component in FIG. 1, the source or sources 112 are typically a line or an array of sources 112. The generated seismic waves 114, 115 include seismic body waves 114 that travel into the subterranean formation 101 (for example, in a direction perpendicular to the ground surface 103) and seismic surface waves 115 that travel along (for example, parallel to) the ground surface 103 and diminish as they get further from the surface. The seismic surface waves 115 travel more slowly than seismic body waves 114.

The velocity of the seismic waves 114, 115 depend on properties, for example, the elastic properties described above. In some examples, the velocity of the seismic waves 114, 115 depend on a density, a porosity, and a fluid content of the medium through which the seismic waves are traveling. Different geologic bodies and/or formation layers in the earth are distinguishable because the formation layers have different properties and, thus, different characteristic seismic velocities.

For example, in the subterranean formation 101, the velocity of seismic waves 114, 115 traveling through the subterranean formation 101 will be different in the sandstone layer 104, the limestone layer 106, and a sand layer. As the seismic body waves 114 contact interfaces between geologic bodies or formation layers that have different velocities, each interface reflects some of the energy of the seismic wave and refracts some of the energy of the seismic wave. Such interfaces are sometimes referred to as horizons. Each interface is associated with a reflection coefficient that represents a proportion of reflected energy to refracted energy by an impedance discontinuity at the interface.

The wellbore system 100 includes a sensor 116 that measures the reflected energy of seismic body waves 114 which represents a propagation of the seismic waves 114, 115, through the subterranean formation 101. In some examples, the sensor 116 is a seismometer or a geophone-receiver. In some examples, the wellbore system 100 includes multiple sensors 116. For example, although illustrated as a single component in FIG. 1, the sensor or sensors 116 are typically a line or an array of sensors 116 that generate an output signal in response to received seismic waves including waves reflected by the horizons in the subterranean formation 101. The sensors 116 produce electrical output signals transmitted as input data, for example, to a computer 118 on a seismic control truck 120.

The wellbore system 100 includes a control center 122 operatively coupled to the seismic control truck 120 and other data acquisition and wellsite systems. The control center 122 includes a computer 124. The control center 122 includes facilities for receiving, storing, processing, and analyzing data from the seismic control truck 120 and other data acquisition and wellsite systems that provide additional data about the subterranean formation. For example, the computer 124 receives the measured seismic data from the sensor 116 and well log data from a well log instrument of a wellbore 134.

The wellbore system 100 includes one or more wellbores 134. In the example shown in FIG. 1, the wellbore system 100 includes two wellbores 134. However, other wellbore systems 100 include less than one wellbore 134 (for example, one or none) and some include more than two wellbores 134 (for example, five, ten, or twenty). In some examples, the wellbores 134 are used for reservoir exploration (for example to determine properties of the rock of the subterranean formation 101 and/or to determine potential future drilling sites). In some examples, the wellbores 134 are used for hydrocarbon recovery as part of a production well. In some examples, the wellbores 134 are used for enhanced recovery (for example, waterflooding, chemical flooding). Boreholes 136 are formed at each wellbore 134 from the ground surface 103 into the subterranean formation 101. For example, a drill located at each wellbore 134 drills a respective borehole 136 into the subterranean formation 101.

Although the ground surface 103 is illustrated as a land surface in FIG. 1, the ground surface 103 may be a sub-sea or other underwater surface, such as a lake or an ocean floor or other surface under a body of water. In such examples, the boreholes 134 can be formed under a body of water from a drilling location on or proximate the body of water.

The boreholes 136 include a surface casing positioned and set around the borehole 136 from the ground surface 103 into a particular depth in the earth. For example, the surface casing may be a relatively large-diameter tubular member (or string of members) set (for example, cemented) around the borehole 136 in a shallow formation. As used herein, "tubular" may refer to a member that has a circular cross-section, elliptical cross-section, or other shaped cross-section. Cement is positioned (for example, pumped) around the casing in an annulus between the casing and the borehole 136. The cement, for example, may secure the casing to the formation layers 102, 104, 106 of the subterranean formation 101. In some examples, the cement is installed along the entire length of the casing or used along certain portions of the casings if adequate for the particular borehole 136. Other casings, such as conductor casings or intermediate casings, can be used in the wellbore system 100.

Each wellbore 134 includes a well log instrument 138 communicably coupled to a computer 119 associated with a well logging unit 121. In the example shown, the well logging unit 121 is a mobile truck. The well log instrument 138 is electrically coupled to the computer 119 using a downhole conveyance 140, such as a wirelines, optical line, or other data communication cable. The downhole conveyance 140 provides data from the well log instrument 138 to the computer 119, for real time (for example, during logging operations) or later usage in measuring one or more properties of the borehole 136.

In some examples, the well log instrument 138 measures elastic properties of the rock of the formation layers 102, 104, 106. For example, the well log instrument 138 measures a phase velocity, a density, and/or an impedance of each of the layers 102, 104, 106 as the well log instrument 138 traverses the borehole 136. In some examples, the well log instrument 138 measures the elastic properties as a function of depth (Z) within the borehole 136. In some examples, the well log instrument 138 measures other elastic properties in addition to the phase velocity, the density, and/or the impedance of each of the layers 102, 104, 106 (for example, a porosity, a permeability, a modulus, a Poisson's ratio, in-situ stresses, and/or pore pressures within and/or surrounding the borehole 136).

In some examples, the well log instrument 138 measures geometric data associated with the borehole 136 in addition to measuring the elastic properties. For example, the well log instrument 138 measures the current depth associated with the elastic property measurement, a total depth of the borehole 136, and/or a radius of the borehole 104.

In general, the computers 118, 119, and 124 define a computer system 142 in network communication with each other and operable to transmit and receive data throughout the wellbore system 100 and with external actors (for example, remote databases, external computers). In some examples, the computer system 142 includes a processor and any and/or all of the computer hardware of computer 350 described with reference to FIG. 14.

In some examples, computer system 142 is operable to analyze, model, control, optimize, or perform management tasks of field operations associated with development and production of resources such as oil and gas from the subterranean formation 101. In some examples, the computer system 142 includes functionality for manipulating and analyzing the data, such as performing seismic interpretation or borehole resistivity image log interpretation to identify geological surfaces in the subterranean formation or performing simulation, planning, and optimization of production operations of the wellbore systems 134. In some examples, results generated by the computer system 142 are displayed for user viewing using local or remote monitors or other display units. One approach to analyzing seismic data is to associate the data with portions of a seismic cube representing represent the subterranean formation 101. The seismic cube can also display results of the analysis of the seismic data associated with the seismic survey.

Figure 2:
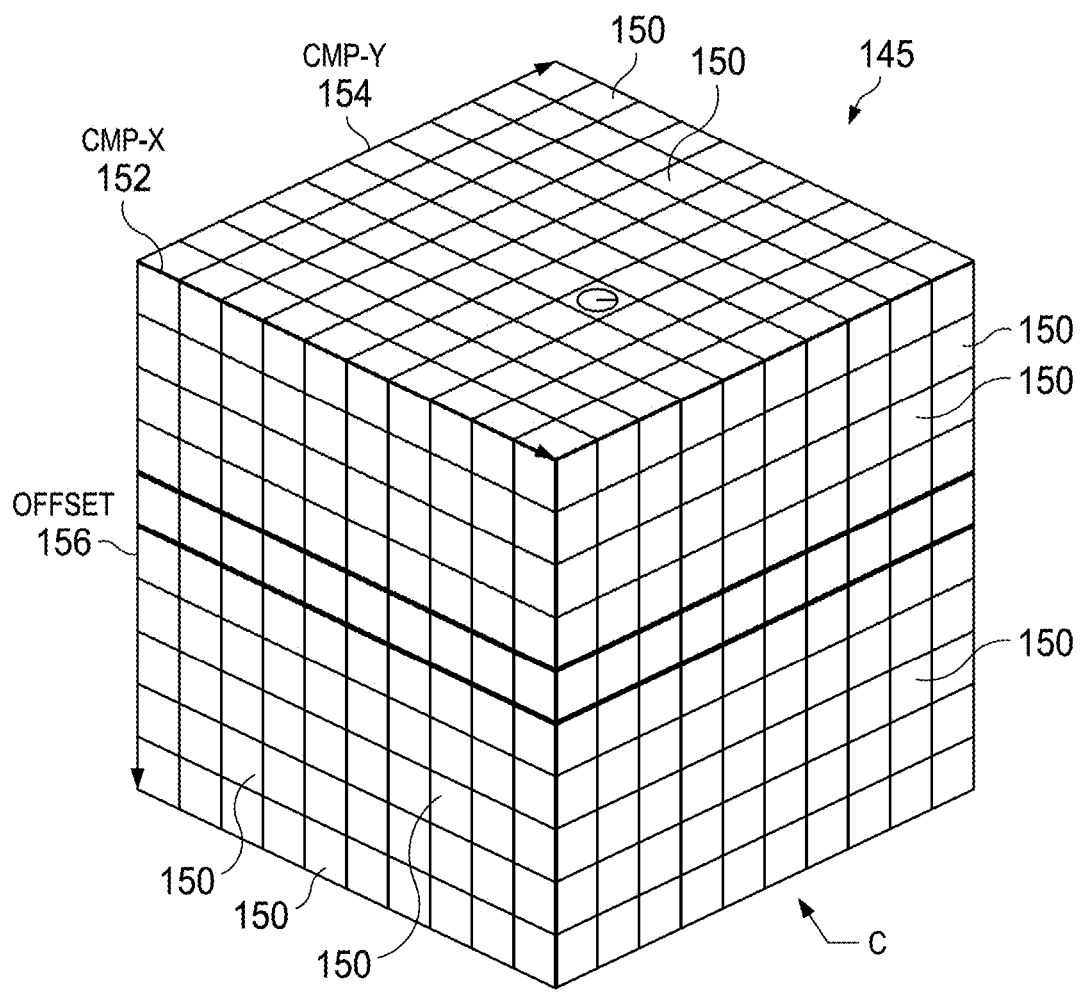
FIG. 2 is an illustration of a seismic cube representing at least a portion of a subterranean formation.

FIG. 2 illustrates a seismic cube 145 representing at least a portion of the subterranean formation 101. The seismic cube 145 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, the computer system 142 can perform a statistical analysis on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
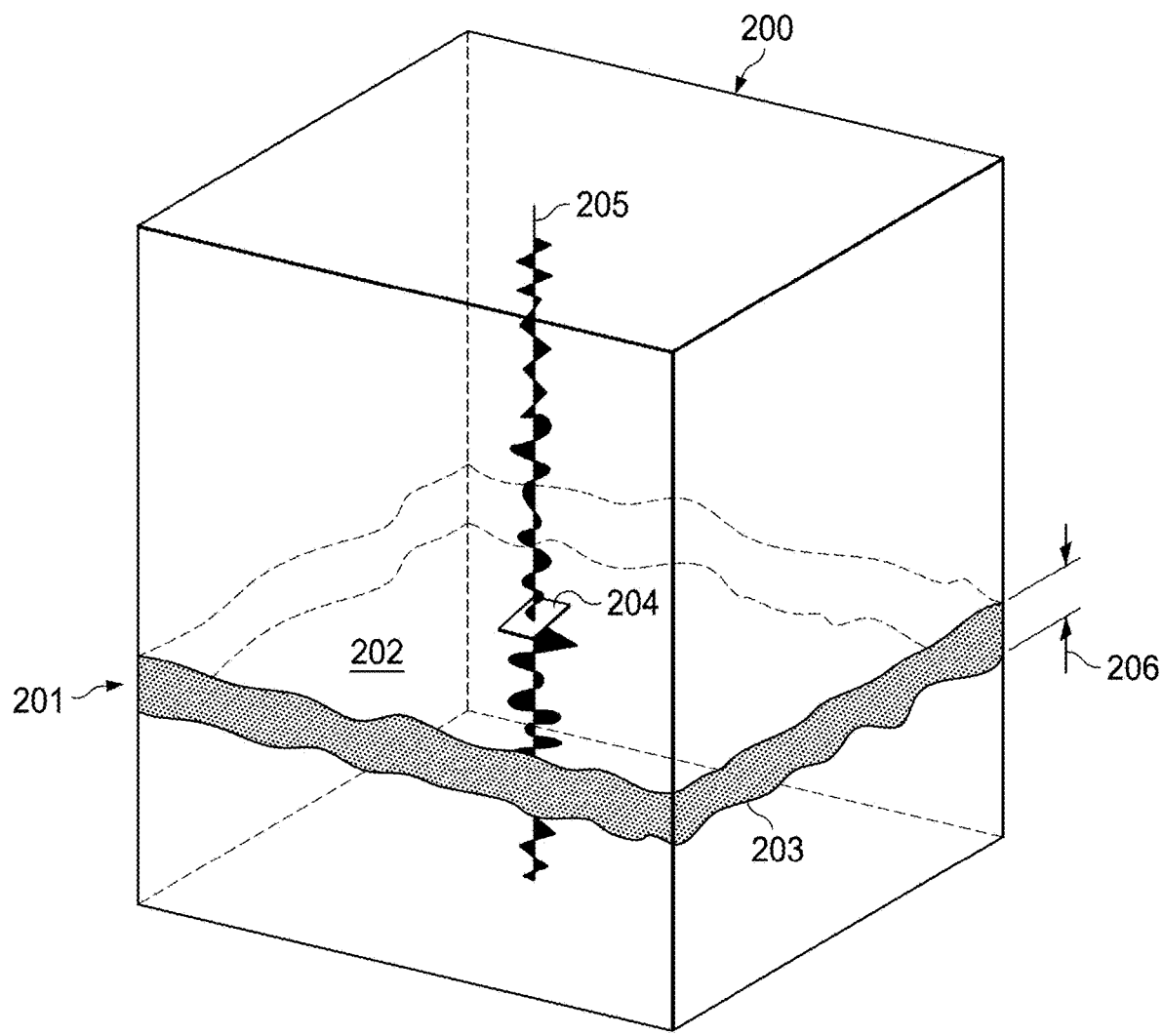
FIG. 3 is an illustration of a stratigraphic trace within a subterranean formation.

FIG. 3 is an illustration of a stratigraphic trace within a subterranean formation. The seismic cube 200 has a stratum 201 based on a surface (for example, an amplitude surface 202) and a stratigraphic horizon 203. The amplitude surface 202 and the stratigraphic horizon 203 are grids that include many cells such as exemplary cell 204. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

The wellbore system 100 measures seismic data at multiple locations along the ground surface 103 and the computer system 143 uses the seismic data to determine layer attributes of the subterranean formation 101.

Figure 4C:
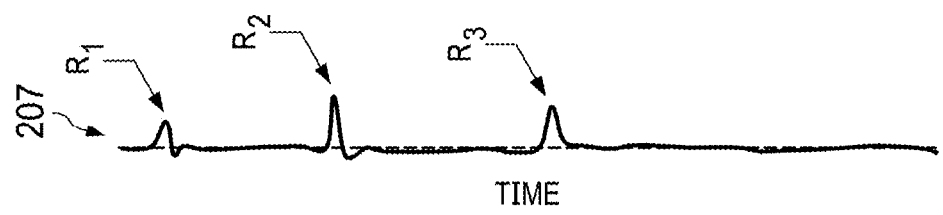
FIGS. 4A, 4B, and 4C are schematic illustrations if a process of stacking a group of seismic traces to improve the signal to noise ratio of the traces.
Figure 4B:
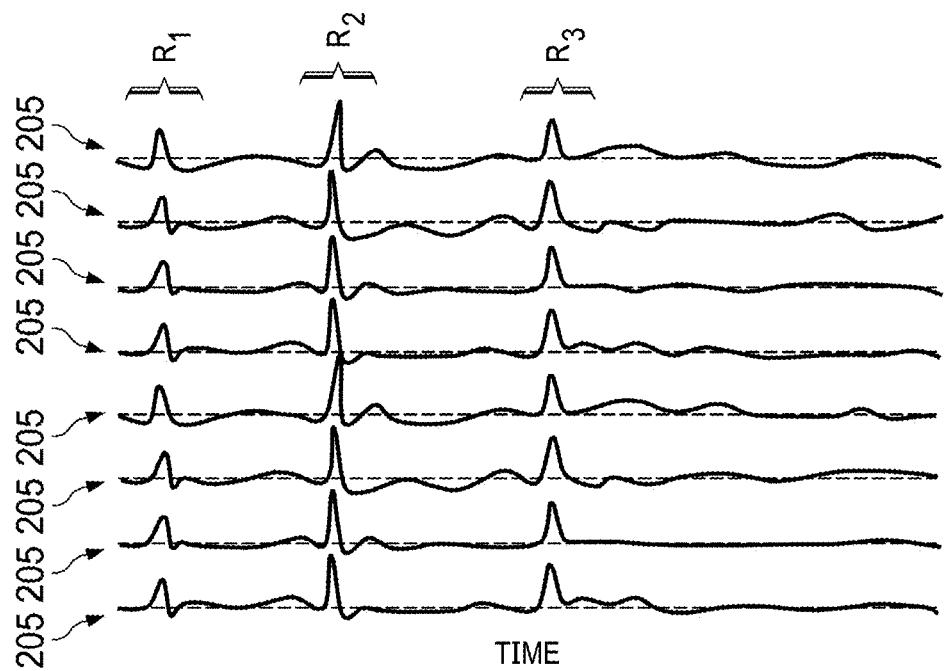
Figure 4A:
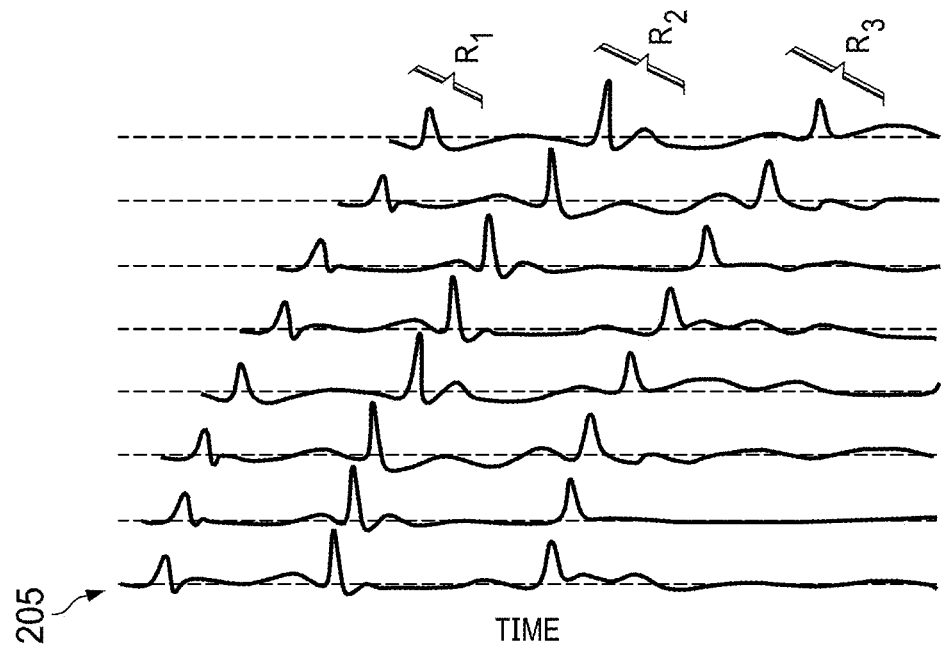

FIG. 4A-4C schematically illustrate the process stacking a group of seismic traces 205 to improve the signal to noise ratio of the traces. FIG. 4A illustrates a common midpoint (CMP) gather of eight traces 205 generated by a set of sources and sensors that share a common midpoint. For ease of explanation, the traces are assumed to have been generated by reflections from three horizontal horizons.

The traces 205 are arranged with increasing offset from the CMP. The offset of the traces 205 from the CMP increase from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections (R1, R2, R3) from each of the horizons to arrive for source-sensor pairs with increasing offsets from the CMP reflects this increased slant time.

FIG. 4B shows the traces 205 after normal moveout (NMO) correction. NMO is the difference between vertical reflection time and the slant reflection time for a given source-sensor pair. This correction places reflections (R1, R2, R3) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset for a specific source-sensor pair are known parameters for each trace. However, the velocity is usually not readily available. As previously discussed, the velocity of seismic waves depends properties, for example, density, porosity, and fluid content of the medium through which the seismic waves are traveling and consequently varies with location in the subterranean formation being studied.

FIG. 4C shows a stack trace 207 generated by summing the traces 205 of the CMP gather and dividing the resulting amplitudes by the number of traces in the gather. The number of traces in the gather is also referred to as the fold of the gather. The noise tends to cancel out and the reflections (R1, R2, R3) from the horizons of the subterranean formation 101 are enhanced.

Figure 5:
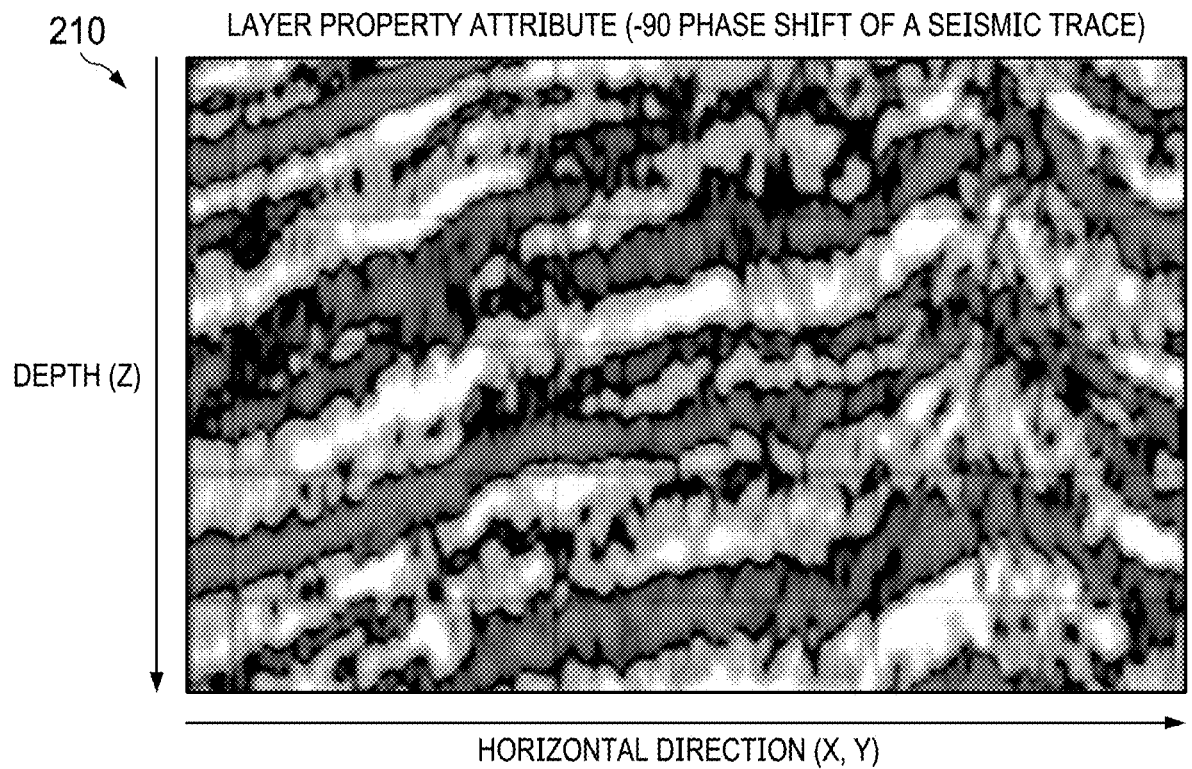
FIG. 5 is a plot of a layer property attribute of a subterranean formation

FIG. 5 is a plot 210 of a layer property attribute of the subterranean formation 101. In some examples, the computer system 142 determines the layer property attributes using pre-stack seismic data (for example, when the seismic traces are aligned as shown in FIG. 4B but not summed as shown in FIG. 4C). The seismic traces should all be at zero phase before the computer system 142 determines the layer attribute. If the wavelet phase has changed, then the computer system 142 performs a deconvolution to set the phase to zero phase. Once all the traces 205 are at zero phase, the computer system 142 shifts each seismic trace 205 by −90 degrees to convert the seismic data to a layer property attribute.

The computer system 142 plots each of these shifted traces 205 side by side to generate the layer property attribute plot 210 as shown in FIG. 5. The layer property attribute plot represents a relative elastic property (for example, impedance) determined from the measured seismic data. The determined layer property attribute spans a depth (Z) into the subterranean formation 101 and a horizontal span (X, Y) along a horizontal direction of the subterranean formation 101. The peaks and valleys represented by the shading of the layer property attribute plot 210 as shown in FIG. 5 represents the relative magnitude of the elastic property. The layer property attribute plot 210 represents a relative magnitude of the elastic property. This is because there is generally insufficient data in the seismic data alone to determine an actual magnitude of the elastic property.

Figure 6:
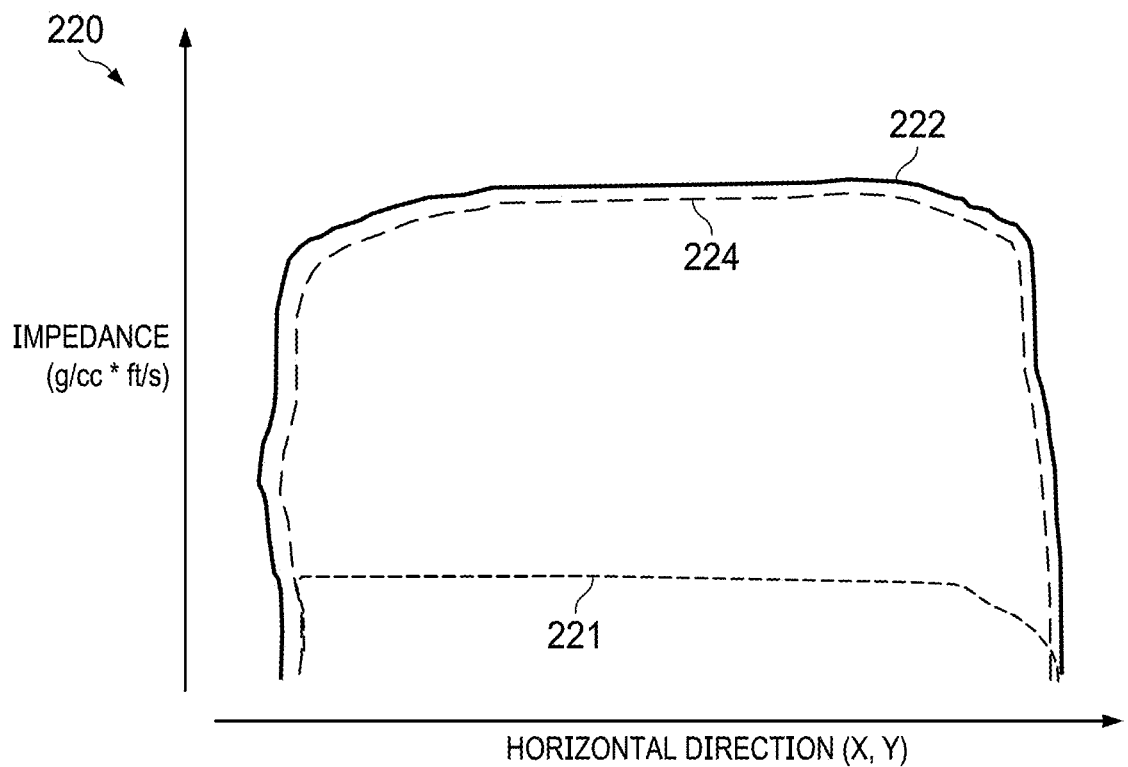
FIG. 6 is a plot of a scaling process to determine scaled elastic properties from the seismic data.

FIG. 6 is a plot 220 of a scaling process to determine the actual elastic properties from the seismic data. The plot 220 includes an impedance spectrum 221 from the seismic data alone. The impedance spectrum 221 is plotted in terms of impedance magnitude (grams per cubic centimeter times feet per second—g/cc*ft/s) as a function of the horizontal span (X, Y) along a horizontal direction of the subterranean formation 101. The plot 20 represents a particular depth (Z) within the subterranean formation 101.

The impedance spectrum 221 is a relative attribute in the sense that the actual magnitude is generally not known based on the seismic data alone. The plot 220 also includes an impedance spectrum 222 from the well log data alone. The computer system 142 scales (or calibrates) the impedance spectrum 221 based on the impedance spectrum 222 to determine the scaled attribute, or scaled impedance spectrum 224.

The systems and methods described in this specification assume that limited control wells are present for such calibration purposes. Therefore, the relative attribute from the seismic scale is used when extrapolating elastic properties of the first region 130 to the second region 132, and so on. By using the relative attribute during the extrapolation (for example, compared to a scaled attribute), the computer system 142 helps to reduce and avoid any bias away from the actual control wells. After extrapolation, the computer system 142 uses a machine learning model (for example, the machine learning model 238 described with reference to FIGS. 7 and 9) to estimate the actual impedances values in the second region 132 and away from the control wells by scaling the relative quantities.

Figure 7:
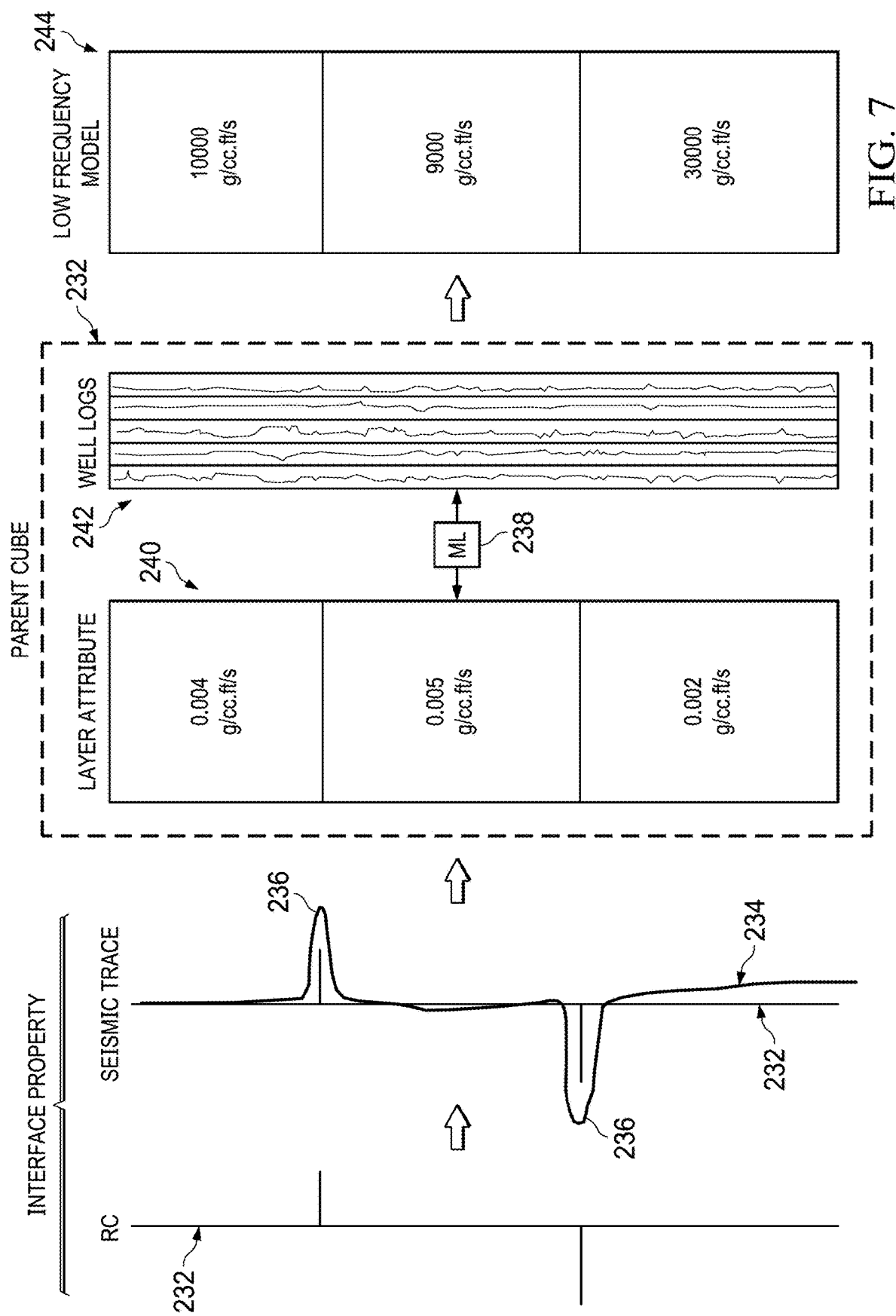
FIG. 7 is a schematic of a process that represents a machine learning model that the computing system executes to determine layer attributes within a parent cube.

FIG. 7 is a schematic of a process that represents a machine learning model 238 that the computing system 142 executes to determine layer attributes 240 within a parent cube 230. In this example, the parent cube 230 represents the first region 132 of the subterranean formation 101 described with reference to FIG. 1. A reflection coefficient (RC) model 232 is shown as a function of depth (Z) into the subterranean formation 101 and represents an interface property (for example, the impedance changes at respective boundaries) between the formation layers 102, 104, 106. In this example, the reflection coefficient model 232 is used as a visual guide and is not generally used by the computer system 142. In general, reflection coefficient model 232 represents the reflection coefficient model 232 convolved with a wavelet. A measured seismic trace 234 is shown as a function of depth (Z) into the subterranean formation 101 and includes wavelets 236 that represent the interface property between the formation layers 102, 104, 106. The computer system 142 converts this interface property to a layer property (or attribute) 240 by shifting the phase of the seismic trace 234 by −90 degrees.

The computer system 142 executes the machine learning model 238 to generate a low frequency model 244 that spans the entire horizontal area of the parent cube 232 (for example, the entire first region 130) based on the layer attributes 240 and the well log data 242. In some examples, the machine learning model 238 determines the relationship between the well log data 242 and the layer attributes 240 to generate a low frequency model 244. The machine learning process 238 is described in further detail with reference to FIGS. 9 and 10.

Once the computer system 142 generates the low frequency model 244, the computer system 142 extrapolates the low frequency model 244 to adjacent cubes (for example, adjacent regions such as the second region 132). After the extrapolation process is complete, the computer system 142 scales the magnitude of the layer attributes 240 based on the well log data 242 as described with reference to FIG. 6. In the example shown in FIG. 7, the layer attributes 240 and the low frequency model represent acoustic impedance and the units are g/cc*ft/s (for example, acoustic impedance=density (g/cc)×velocity (ft/s)). In this example, the unscaled relative magnitudes of the layer attributes 240 are significantly lower than the scaled low frequency model 244.

Figure 8:
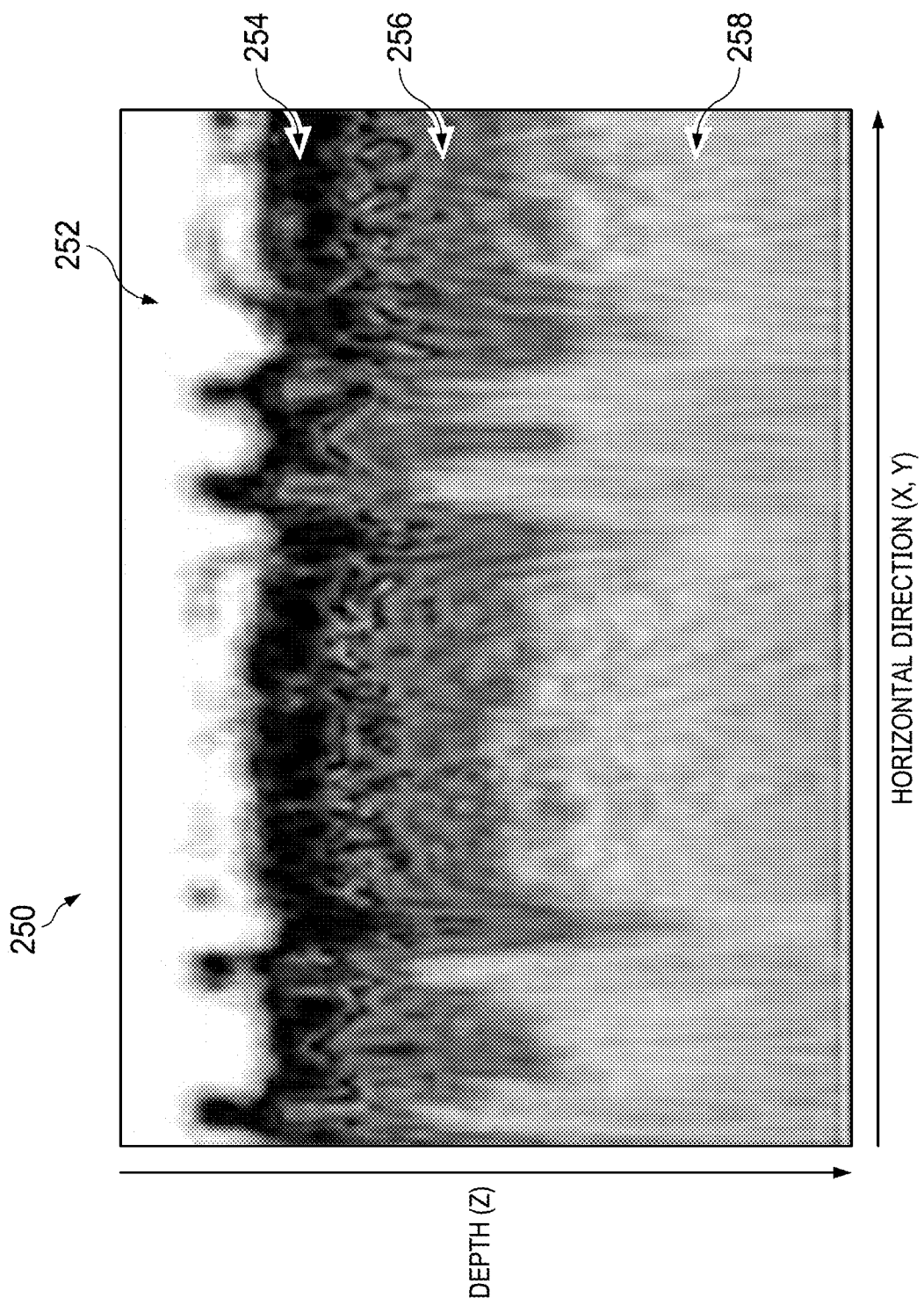
FIG. 8 is an example of a low frequency model for seismic inversion.

FIG. 8 is an example of a low frequency model 250. The low frequency model 250 is a plot of scaled layer attributes as a function of depth (Z) into a subterranean formation and horizontal distance (X, Y) along a horizontal direction of the subterranean formation. The particular shading shown the low frequency model 250 represents a particular magnitude (either scaled or relative) of the layer attribute. In some examples, the layer attribute includes an acoustic impedance. The low frequency model 250 indicates four distinct layers 252, 254, 256, 258 having an interface between them. The low frequency model 250 is used as part of a seismic inversion process.

Figure 9:
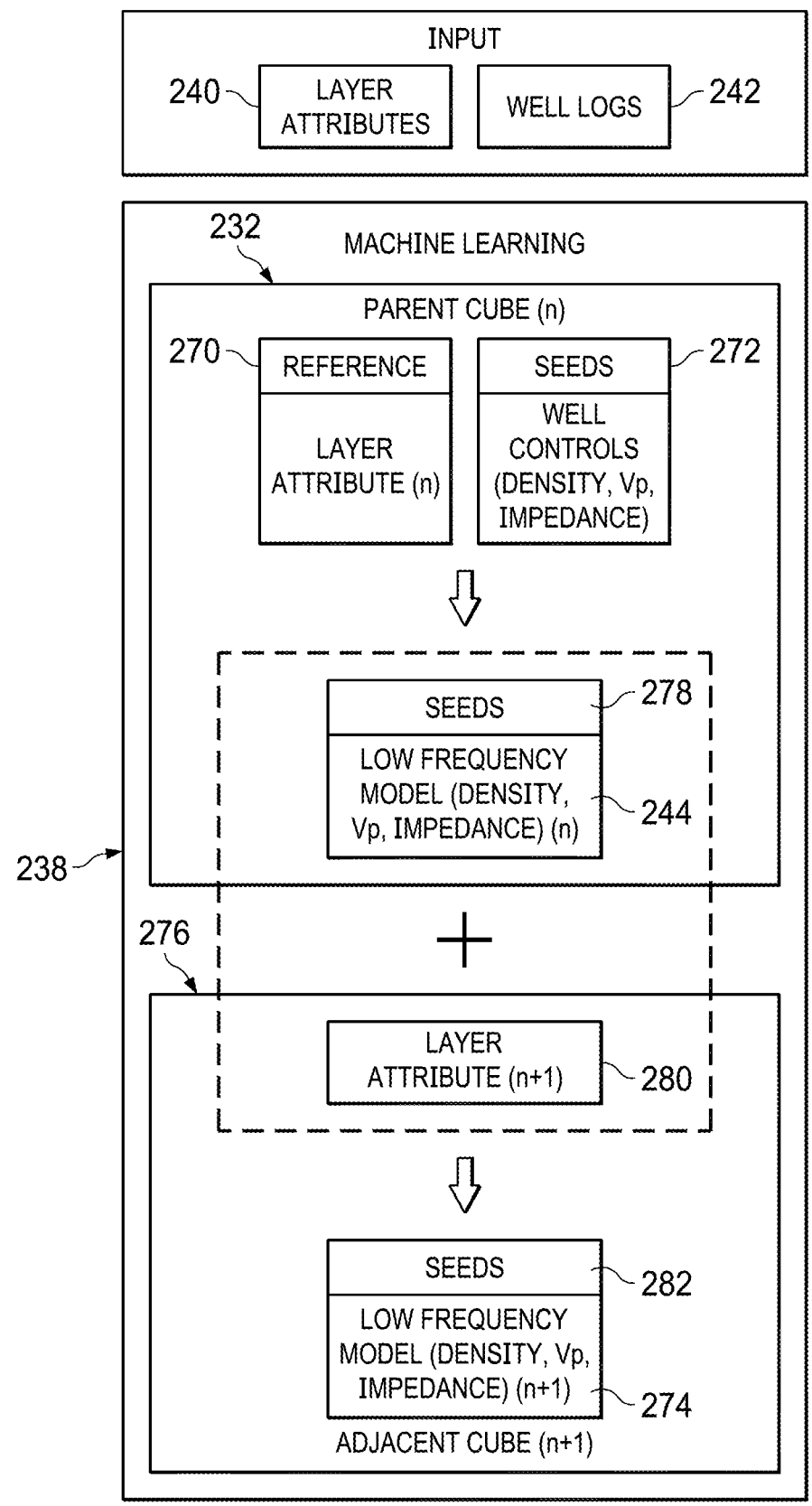
FIG. 9 is a schematic of the inputs and seeds of the machine learning model to generate a low frequency model.

FIG. 9 is a schematic of the inputs, seeds, and outputs of the machine learning model 238 to generate a low frequency model. The machine learning model 238 receives relative (for example, unscaled) layer attributes 240 and well log data 242 as input conditions. The machine learning model 238 uses the relative layer attributes 240 as a reference 270 and the well log data 242 as "seeds" 272 for the parent cube (n) 232 (for example, the first region 130). As used throughout this specification, "seeds" refers to location-based constraints for the machine learning model 238. In the context of this specification, using the well log data 242 as seeds 272 means that the property attributes of the formation layers at the particular locations where the well log data 242 was measured defines a constraint for the machine learning model 238.

The computer system 142 generates the relative (for example, unscaled) low frequency model 244 for the parent cube (n) 232 using both the relative layer attributes 240 and the well log data 242. For example, the machine learning model 238 determines the relationship between the well log data 242 and the layer attributes 240 to generate the low frequency model 244. In this example, the low frequency model 244 spans the entire horizontal area of the parent cube (n) 232 (for example, the entire horizontal area of the first region 130).

The computer system 142 generates a second relative low frequency model 274 for an adjacent cube (n+1) 276 (for example, the second region 132). The computer system 142 uses the relative low frequency model 244 of the parent cube (n) 232 as seeds 278 to the machine learning model 238 and relative layer attributes 280 for the adjacent cube (n+1) 276 as a reference. The resulting relative low frequency model 274 is a superset of the relative low frequency model 244 and spans the entire horizontal area of the parent cube (n) 232 and the adjacent cube (n+1) 276 (for example, the entire horizontal area of the first region 130 and the second region 132 combined). While described as first and second relative low frequency models, in some examples, the computer system 142 updates the low frequency model 244 to become the low frequency model 274.

The computer system 142 recursively extrapolates the relative low frequency model to other adjacent cubes to generate a relative low frequency model that spans larger and larger areas. For example, the relative low frequency model 274 would be used as a seed 282 in addition to relative layer attributes from the third cube (for example, a n+2 cube). In some examples, this process is performed using deep learning. For example, the computing system 142 uses a recurrent neural network (RNN) and/or a convolutional neural network (CNN) model as the machine learning model.

There is no limit to the number of cubes that can be recursively considered by the computer system 142. For example, the computer system 142 can recursively generate a relative low frequency model that spans 10 cubes and/or the computer system 142 can recursively generate a relative low frequency model that spans 100 cubes using the process described with reference to FIG. 9.

In some examples, the computer system 142 balances the seismic data in the adjacent cube (n+1) with the parent cube (n) to reduce the chances of bias affecting the results of the low frequency model. In some examples, the computer system 142 generates a root mean square (RMS) map of the entire cube and identifies outliers as unbalanced values. Once the computer system 142 completes the extrapolation of the relative low frequency model, the computer system 142 scales the low frequency model to determine actual magnitudes of the values represented in the low frequency model.

Figure 10:
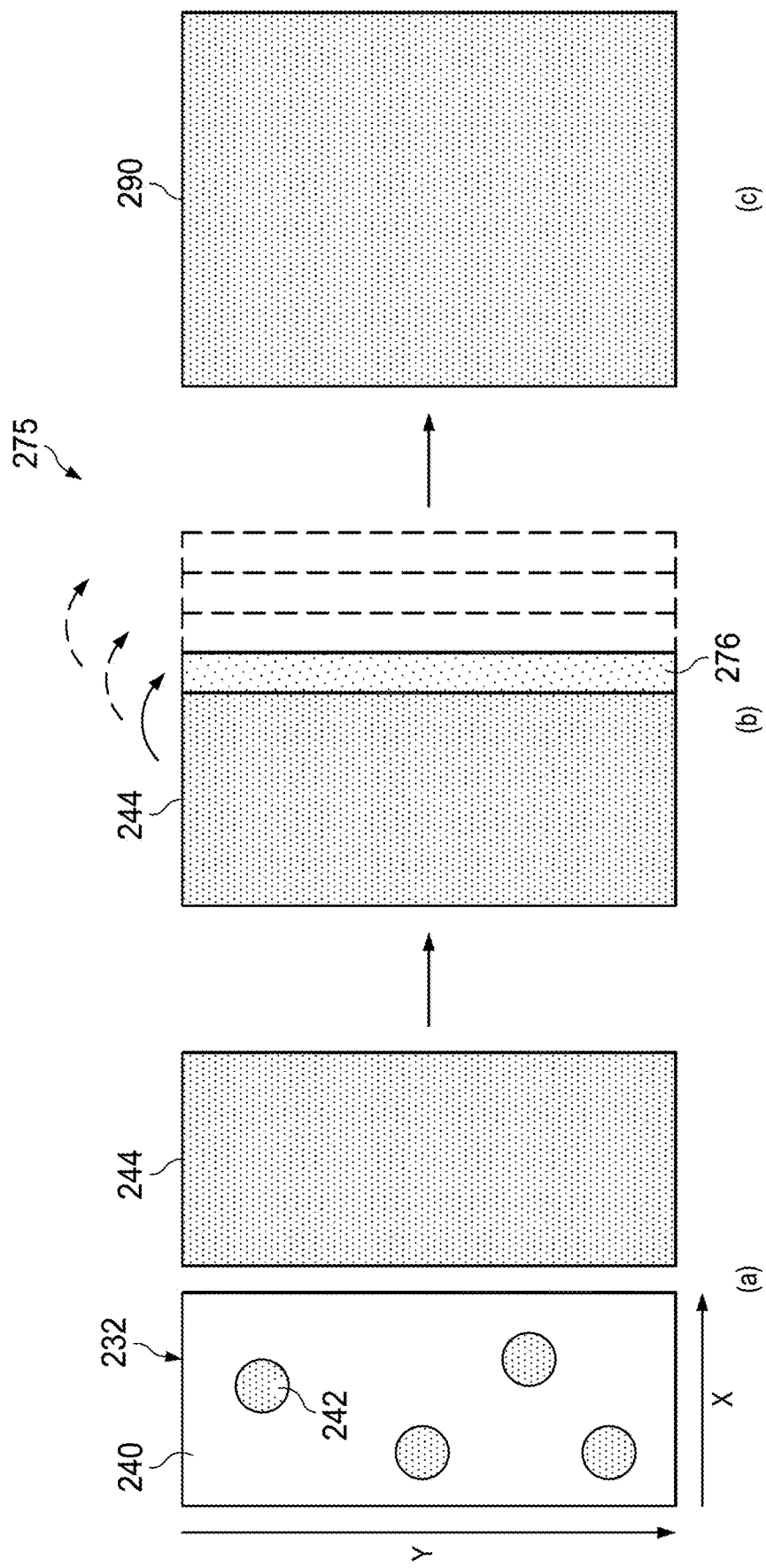
FIG. 10 is an illustration of a recursive process for determining a low frequency model spanning regions without control wells.

FIG. 10 illustrates a recursive process 275 for determining a low frequency model spanning regions without control wells. Referring to FIG. 10(a), the parent cube 232 represents the first region 130 described with reference to FIG. 1. The first region 130 includes wellbores 134 used as seeds 278 for the machine learning model 238. The first region 130 spans a horizontal Y direction and a horizontal Z direction as described with reference to FIG. 1. The well log data includes a location of each of the wellbores 134 using a coordinate (X, Y). The location is used by the machine learning model 238 to generate the relative low frequency model. The computer system 142 uses the well log data 242 and the relative layer attributes 240 to generate the relative low frequency model 244. The relative low frequency model 244 spans the entire X and Y dimension of the first region 130.

Referring to FIG. 10(b), the computer system 142 recursively extrapolates the relative low frequency model 244 to span larger and larger areas. The output of the layer is fed back into the same layer as an input to generate training data for the next adjacent layer. In some examples, this is performed by selecting random seed values around the cube.

There is no constraint on the size of the adjacent cubes. In some examples, the cubes are the same size. In some examples, the cubes are different sizes. The extrapolated relative low frequency model spans the entire X and Y dimension of the all regions included in the extrapolation. In some examples, the adjacent cube 276 does not include any wellbores and/or does not have any well log data available.

Referring to FIG. 10(c), the computer system 142 generates a scaled low frequency model 290 based on the results of the recursive extrapolation and the well log data from the parent cube 232 similar to the process described with reference to FIG. 6. The result is a low frequency model generated by a deep learning approach of the machine learning model 238.

Figure 11:
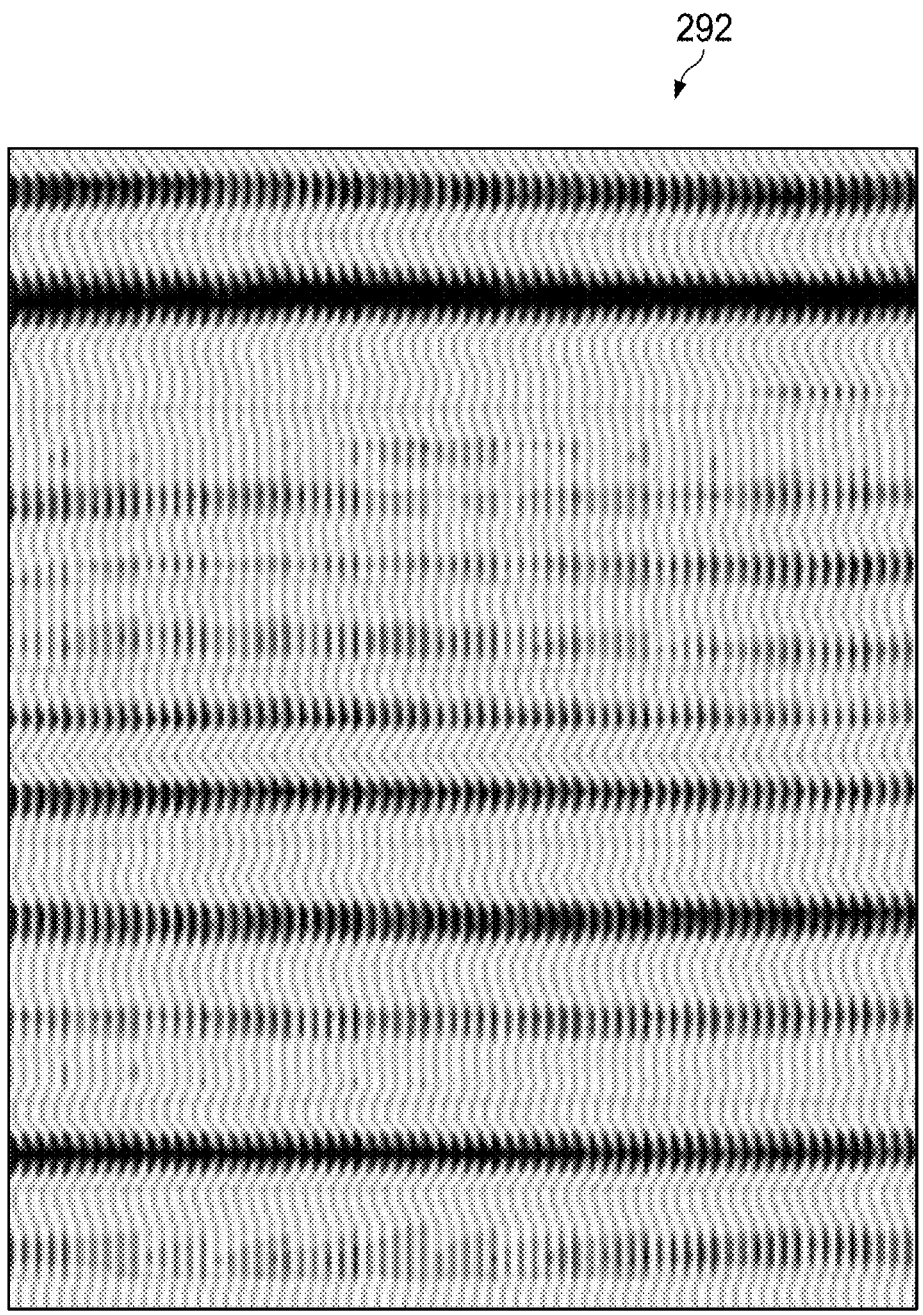
FIG. 11 is a plot of seismic data.
Figure 12:
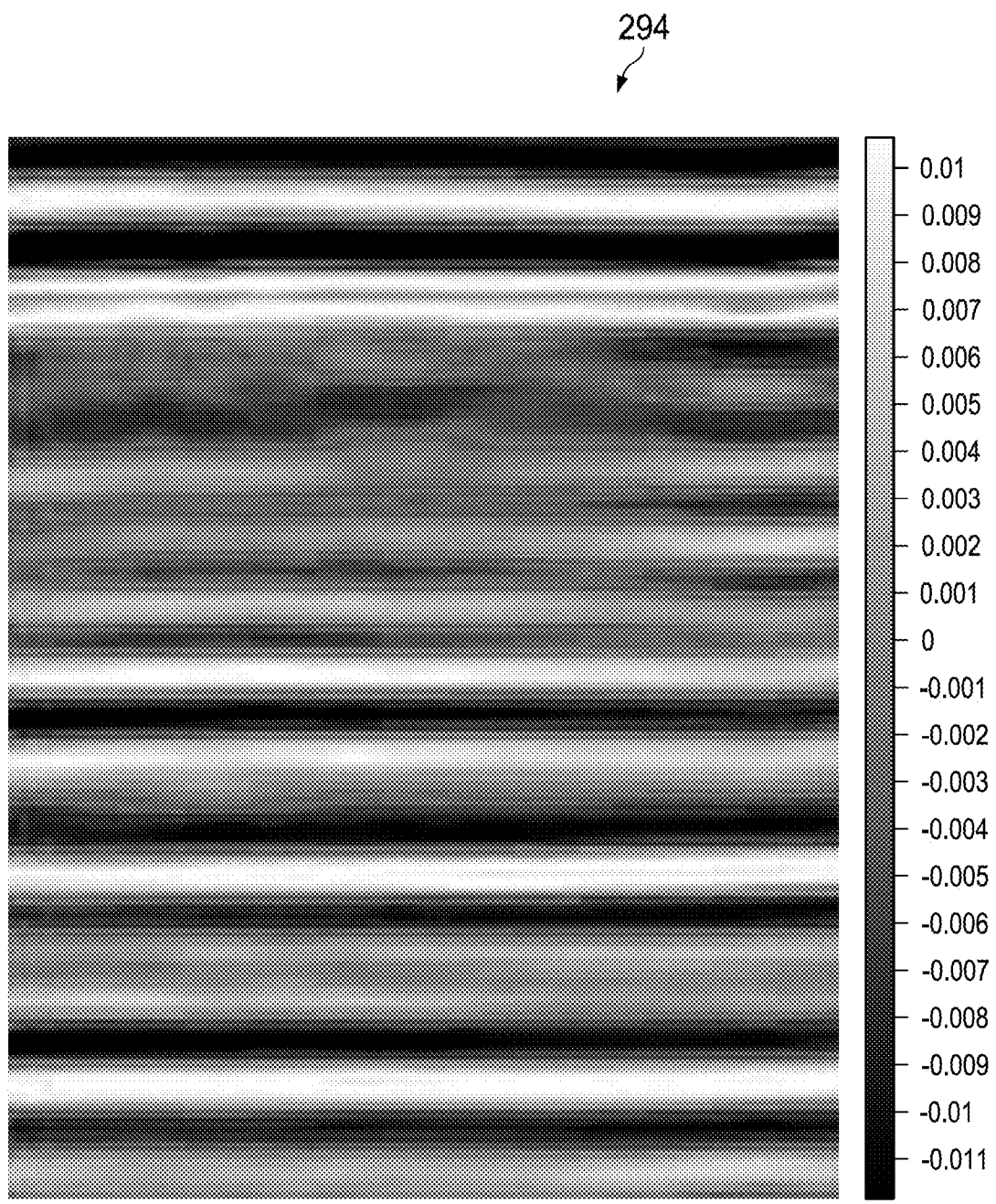
FIG. 12 is plot of layer attributes based on the seismic data of FIG. 11.

FIG. 11 is a plot 292 of seismic data and FIG. 12 is plot 294 of layer attributes based on the seismic data shown in FIG. 11. FIGS. 11 and 12 illustrate a real world example of transforming seismic data to a layer attribute. As shown in this example, layer attributes provide an image for human interpretation and/or for processing using a geo-statistical and/or neural-network computer analysis.

Figure 13B:
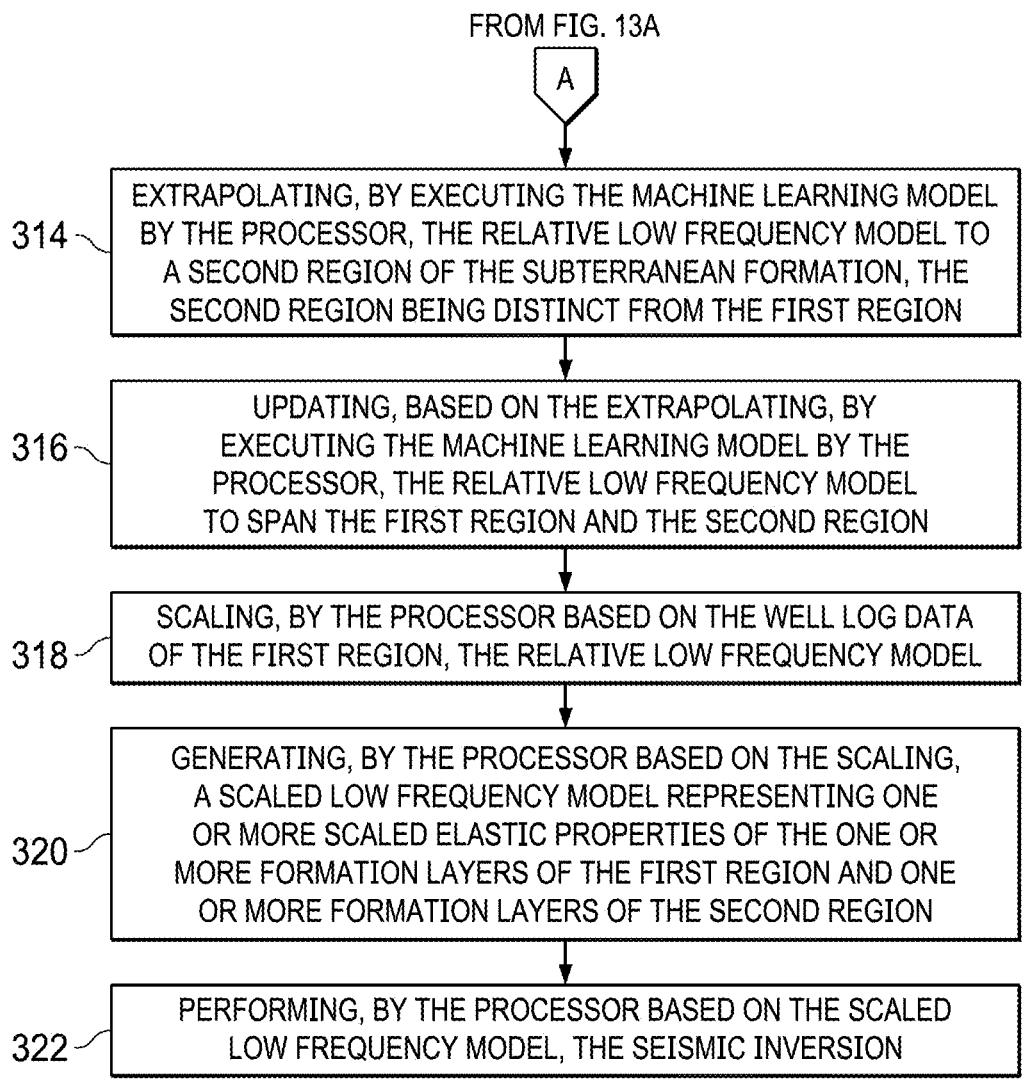

FIGS. 13A and 13B represent a flow chart of a method 300 for generating a low frequency model of a subterranean formation. For example, the computer system 142 described with reference to FIG. 1 stores computer instructions that, when executed by a processor of the computer system 142, cause the processor to perform one or more operations of the method 300.

At step 302, a processor receives, from a first seismometer, seismic data for a first region of the subterranean formation. The seismic data representing a propagation of seismic waves within the first region. For example, the seismometer 116 measures seismic waves 114, 115 generated by a source 112. The seismic waves 114, 115 travel through the subterranean formation 101 of the first region 130, reflect off of the interfaces between the layers 102, 104, 106 and are received by the seismometer 116. The seismometer 116 communicates with a processor 118 of a seismic truck 120 and transmits the measured seismic data of the first region 130 to the processor 124 of the computer system 142. The processor 124 of the computer system 142 receives the seismic data.

At step 304, the processor receives, from a well log instrument, well log data of one or more wells located at the first region. For example, the well log instrument 138 measures well log data (for example, phase velocity, density, and/or impedance) of the rock within the layers 102, 104, 106 of the subterranean formation 101 of the first region 130. The well log instrument 138 communicates with a processor 119 of a well logging unit 121 and transmits the measured well log data of the first region 130 to the processor 124 of the computer system 142. The processor 124 of the computer system 142 receives the well log data.

In some examples, the processor of the computer system 142 conditions the measured well log data. For example, the computer system 142 geo-physically conditions the well log data before using the well log data in step 308. In some examples, the computer system 142 geo-physically conditions the well log data by applying a geophysical well log analysis (GWLA) using rock physics templates (RPT) to remove any outliers and to estimate the missing logs empirically. In some cases, this conditioning reduces an uncertainty of the machine learning model.

In some examples, the processor of the computer system 142 conditions the measured seismic data. For example, the computer system 142 balances the seismic data before using the seismic data in step 306. In some examples, the computer system 142 balances the seismic data by calibrating the seismic data and removing bias (for example, by removing or reducing local minima within the seismic data). In some examples, the computer system 142 balances the seismic data by applying a scaling factor using the following equation: Block-scaled=block1/block2*block2, where "block1" represents a first cube and "block2" represents a second cube.

At step 306, the processor determines, based on the received seismic data of the first region, one or more relative layer attributes of the first region. The one or more relative layer attributes represent one or more relative elastic properties of one or more formation layers of the first region. For example, the computer system 142 determines the relative layer attributes 240 based on the measured seismic traces 234 as shown in FIG. 7. The relative layer attributes 240 represent relative elastic properties (unscaled impedance in the example of FIG. 7) for each distinct layer (for example, layers 102, 104, 106) of the first region 130 of the subterranean formation 101.

In some examples, determining the one or more relative layer attributes of the first region includes transforming the seismic data of the first region by a −90 degree phase shift prior to determining the one or more relative layer attributes. For example, as described with reference to FIG. 7, the computer system 142 applies a −90 degree phase shift to the measured seismic data prior to determining the one or more layer attributes 240 to convert an interface property of the seismic data to the layer attribute 240.

In some examples, transforming the seismic data is performed when the measured seismic data is in a pre-stacked state. For example, as described with reference to FIGS. 4A-4C and 5, the computer system 142 determines the layer property attributes using pre-stack seismic data. For example, when the seismic traces are aligned as shown in FIG. 4B but not summed as shown in FIG. 4C.

While the relative elastic properties related to impedance in the example of FIG. 7, the computer system 142 can determine other elastic properties from the seismic data as well. For example, the computer system 142 can determine relative densities and/or relative phase velocities, in addition to, or instead of, the relative impedances.

At step 308, the processor determines, based on the one or more relative layer attributes of the first region, one or more first input values for a machine learning model. For example, as shown in FIGS. 9 and 10(*a*), the computer system 142 determines inputs to the machine learning model 238 as the reference input 270. The reference input 270 represents the relative layer attributes 240.

At step 310, the processor determines, based on the received well log data, one or more second input values for the machine learning model. For example, as shown in FIG. 9 and FIG. 10(*a*), the computer system 142 determines inputs to the machine learning model 238 as the seeds 272. The seeds 272 represent the well log data 242 of density, phase velocity, and impedance. The geographic location of the seeds 272 represent the discrete locations of the wellbores in the first region 130.

At step 312, the processor generates, based on the one or more first input values and the one or more second input values, by executing the machine learning model, a relative low frequency model for the first region. For example, as shown in FIGS. 7 and 9, the computer system 142 uses the machine learning model 238 to generate a relative low frequency model 244 in the first region 130 based on the layer attributes 240 as a reference input 270 and the well log data 242 as input seeds 272.

In some examples, the relative low frequency model represents at least one of a density, a velocity, and an impedance for the one or more formation layers of the first region. For example, as shown in FIG. 7, the relative first low frequency model 244 represents an impedance of the formation layers 102, 104, 106 as a function of depth (Z) and horizontal span (X, Y) of the first region 130.

At step 314, the processor extrapolates, by executing the machine learning model, the relative low frequency model to a second region of the subterranean formation. The second region being distinct from the first region. For example, as shown in FIGS. 9 and 10(*b*), the control system 242 extrapolates the relative low frequency model 244 from the first region 130 represented by the parent cube (n) 232 to the second region 132 represented by the adjacent cube (n+1) 276.

At step 316, the processor updates, based on the extrapolating, by executing the machine learning model, the relative low frequency model to span the first region and the second region. For example, as described with reference to FIGS. 9 and 10(*b*), the computer system 242 executes the machine learning model 238 to update the low frequency model and/or generate a second relative low frequency model 274 that spans an area of the first region 130 and the second region 132. In some examples, the resulting low frequency model 274 spans an area of the first region 130 and the second region 132 in entirety. The low frequency model 274 is a superset of the low frequency model 244.

In some examples, the second region is void of wells. In some examples, the second region includes wells but well log data within the second region is unavailable and/or is otherwise not used by the machine learning model to generate the low frequencies models. For example, as described with reference to FIG. 9, the machine learning model 238 does not use well log data from the second region 132 or any additional regions other than the first region 130. In such examples, the machine learning model 238 is independent of well log data.

At step 318, the processor scales, based on the well log data of the first region, the relative low frequency model. For example, as described with reference to FIGS. 6 and 9, once the computer system 142 completes the extrapolation process of the relative low frequency model, the computer system 142 scales the relative low frequency model. In some examples, the scaled low frequency model represents the actual magnitudes of the elastic properties of the relative low frequency model. In some examples, the elastic properties include acoustic impedances.

At step 320, the processor generates, based on the scaling, a scaled low frequency model representing one or more scaled elastic properties of the one or more formation layers of the first region and one or more formation layers of the second region. For example, as described with reference to FIGS. 6 and 9, the computer system 142 scales the relative low frequency model to generate a scaled low frequency model based on well log data. In some examples, the scaled low frequency model represents at least one of a density, a velocity, and an impedance for the one or more formation layers of the first region and the one or more formation layers of the second region.

At step 322, the processor performs, based on the scaled low frequency model, the seismic waveform inversion. For example, the computer system 142 performs seismic waveform inversion based on the low frequency model 274 after scaling the low frequency model 274. In some examples, the computer system 142 performs the seismic waveform inversion using the low frequency model 274 as a trend model. For example, the computer system 142 performs the seismic waveform inversion by merging the frequency spectrum of the low frequency model 274 with the frequency spectrum from the seismic data to generate a trend model merged with seismic impedance data (g/cc*ft/s). In some examples, the computer system 142 performs seismic waveform inversion using Jason software to generate an inversion cube based on the trend model.

In some examples, extrapolating the first relative low frequency model to the second region includes recursively extrapolating a previously extrapolated relative low frequency model to one or more additional regions of the subterranean formation. For example, as described with reference to FIGS. 9 and 10(B), the computer system 142 recursively extrapolates the low frequency models to span larger and larger areas. In some examples, the extrapolation spans the entire area of all the regions used in the extrapolation process.

In some examples, updating the relative low frequency model to span the first region and the second region includes recursively updating, based on the recursive extrapolation, the low frequency model to span the first region, the second region, and the one or more additional regions. For example, as described with reference to FIGS. 9 and 10(b), the computer system 142 updates the relative low frequency model 244 so that the relative low frequency model spans the entire area of all the regions used in the extrapolation process. In some examples, each updated relative low frequency model is a superset of the previously generated low frequency model. In some examples, instead of updating, each extrapolated low frequency model defines a new low frequency model (for example, a first, second, third, etc., low frequency model).

In some examples, the processor receives, from a second seismometer, seismic data of the second region. The seismic data representing a propagation of seismic waves within the second region. For example, as shown in FIG. 9, a second region 132 (represented by the adjacent cube (n+1) 276) includes relative layer attributes 280 for the second region 132. A second seismometer (for example, similar to the first seismometer 116 shown in FIG. 1) is used in the second region 132 to measure seismic waves travelling through the second region 132 generated by a second source (for example, similar to the first source 112 shown in FIG. 1). The measured seismic waves are transmitted from a seismic truck to the computer system 142 in a similar manner as described with reference to the seismic truck 120 of FIG. 1.

The processor of the computer system 142 receives the seismic data of the second region 132.

In some examples, the processor determines, based on the received seismic data of the second region, one or more relative layer attributes of the second region. The one or more relative layer attributes of the second region represent one or more relative elastic properties of the one or more formation layers of the second region. For example, as described with reference to FIGS. 9 and 10(b), the computer system 142 determines the relative layer attributes 280 based on the measured seismic traces of the second region 132. The relative layer attributes 280 represent relative elastic properties each distinct layer (for example, layers 102, 104, 106) of the second region 132 of the subterranean formation 101.

In some examples, the processor determines, based on the one or more relative layer attributes of the second region, one or more third input values for the machine learning model. For example, as shown in FIG. 9, the computer system 142 determines inputs to the machine learning model 238 as the relative layer attributes 280 of the second region 132.

In some examples, determining the one or more third input values includes randomly selecting geographic locations within the first region and assigning the one or more third input values as the relative values of the first relative low frequency model at the selected geographic locations. For example, as described with reference to FIG. 10(b), the computer system 142 recursively extrapolates the relative low frequency model 244 to span larger and larger areas by selecting random seed values around the cube.

In some examples, updating the relative low frequency model to span the first region and the second region includes updating, based on the first relative low frequency model and the one or more third input values, by executing the machine learning model, the relative low frequency model spanning the first region and the second region (for example, in entirety). For example, as shown in FIG. 9, the computer system 142 generates the relative low frequency model 274 based on the low frequency model 244 of the first region 130 and the relative layer attributes 280 of the second region 132.

In some examples, the processor calibrates the seismic inversion based on a geological or a stratigraphic map of the first and second region of the subterranean formation. For example, the computer system 142 receives a geological and/or stratigraphic map from a remote database, matches the coordinates of the formation layers from the map to the coordinates of the formation layers from the seismic inversion, determines a difference between these respective coordinates, and adjusts the locations of the formation layers represented in the seismic inversion result to match the coordinates of the map.

In some examples, the processor determines one or more well sites based on the performed seismic inversion. For example, the computer system 142 identifies regions of anticline traps, such as the anticline trap 107 of FIG. 1, by determining when a layer of impermeable cap rock 102 has an upward convex configuration (or where the layer includes a local maxima (for example, a local rise compared to the surrounding regions of that o)). In some examples, the computer system 142 determines that there is a higher chance of trapped oil and gas in regions where anticline traps are identified and determines well sites based on the location of the anticline traps. In some examples, the computer system 142 determines the location of the well sites based on the presence of the impermeable cap rock 102 above the layer where the anticline traps are identified.

In some examples, a drill drills one or more wellbores at each of the one or more well sites. For example, the drills used to drill each wellbore 134 as shown in FIG. 1 is also used to drill additional boreholes into the subterranean formation 101. In some examples, the computer system 142 is operably connected to the drill and controls the drill to drill the wellbores 134.

In some examples, a pump extracts hydrocarbons from the one or more wellbores at the one or more well sites. For example, a pump is located at the well sites and pumps oil and gas trapped underneath the impermeable cap rock 102 to the ground surface 203 for oil and gas processing. In some examples, the computer system 142 is operably connected to the pump and controls the pump to pump the oil and gas to the ground surface 103.

Figure 14:
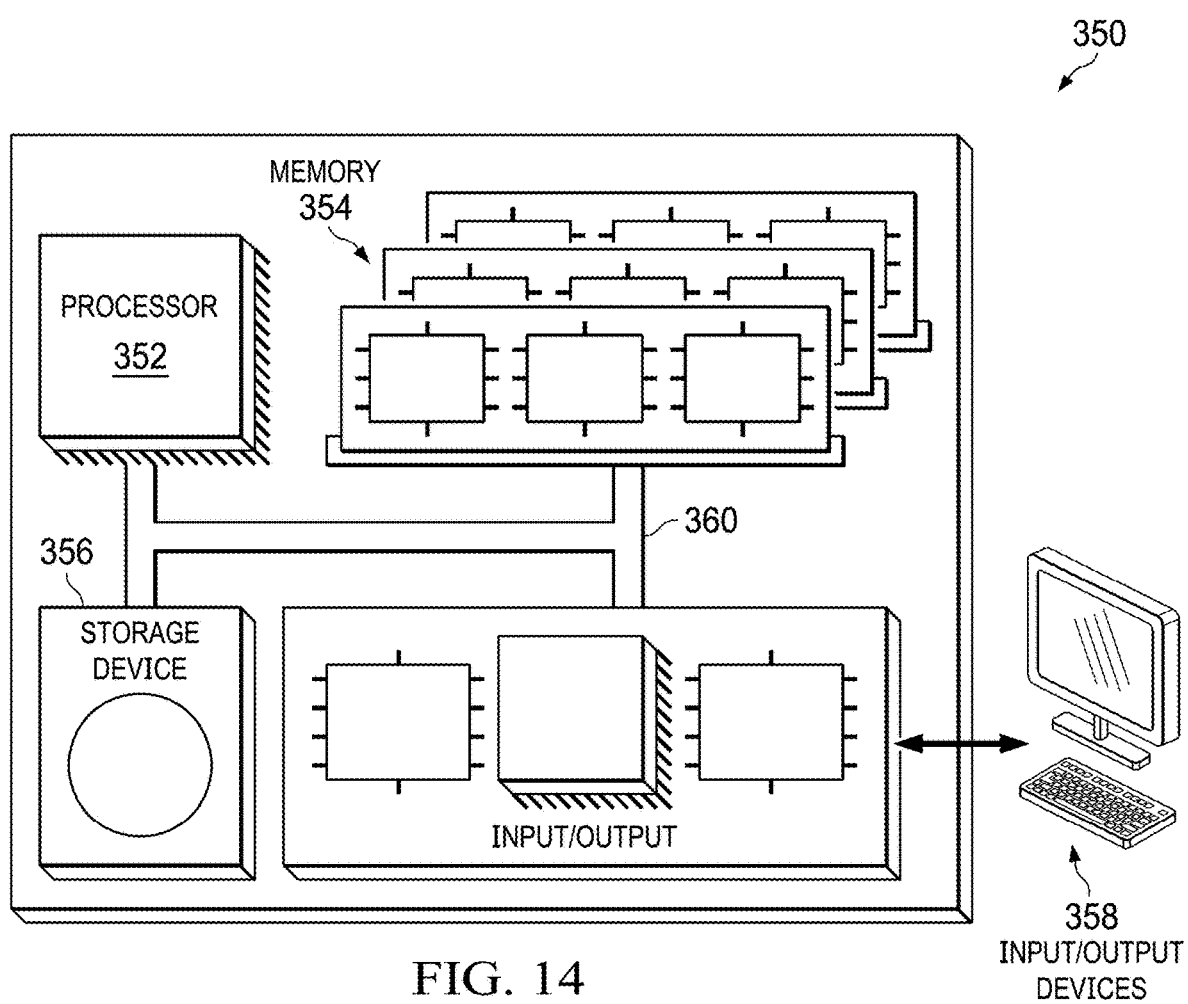
FIG. 14 is a schematic illustration of an example computer of a wellbore system.

FIG. 14 is a schematic illustration of an example computer 350 of a wellbore system. For example, the computer system 142 includes one or more computers 350 for generating a low frequency model of the subterranean formation 101.

The computer 350 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computer 350 includes a processor 352, a memory 354, a storage device 356, and an input/output device 358 (for example, displays, input devices, sensors, valves, pumps). Each of the components 352, 354, 356, and 358 are interconnected using a system bus 360. The processor 352 is capable of processing instructions for execution within the computer 350. The processor may be designed using any of a number of architectures. For example, the processor 352 may be a CISC (Complex Instruction Set Computers) processor, a RISC (Reduced Instruction Set Computer) processor, or a MISC (Minimal Instruction Set Computer) processor.

In one implementation, the processor 352 is a single-threaded processor. In another implementation, the processor 352 is a multi-threaded processor. The processor 352 is capable of processing instructions stored in the memory 354 or on the storage device 356 to display graphical data for a user interface on the input/output device 358.

The memory 354 stores data within the computer 350. In one implementation, the memory 354 is a computer-readable medium. In one implementation, the memory 354 is a volatile memory unit. In another implementation, the memory 354 is a non-volatile memory unit.

The storage device 356 is capable of providing mass storage for the computer 350. In one implementation, the storage device 356 is a computer-readable medium. In various different implementations, the storage device 356 may be a floppy disk device, a hard disk device, an optical disk device, or a tape device.

The input/output device 358 provides input/output operations for the computer 350. In one implementation, the input/output device 358 includes a keyboard and/or pointing device. In another implementation, the input/output device 358 includes a display unit for displaying graphical user interfaces.

The features described can be implemented in digital electronic circuitry, or in computer hardware, firmware, software, or in combinations of them. The apparatus can be implemented in a computer program product tangibly embodied in a data carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying data to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the specification. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of generating a low frequency model of a subterranean formation for performing a seismic waveform inversion, the method comprising:
   receiving, at a processor from a first seismometer, seismic data for a first region of the subterranean formation, the seismic data representing a propagation of seismic waves within the first region;
   receiving, at the processor from a well log instrument, well log data of one or more wells located at the first region;
   determining, by the processor based on the received seismic data of the first region, one or more relative layer attributes of the first region, the one or more relative layer attributes representing one or more relative elastic properties of one or more formation layers of the first region;
   determining, by the processor based on the one or more relative layer attributes of the first region, one or more first input values for a machine learning model;
   determining, by the processor based on the received well log data, one or more second input values for the machine learning model;
   generating, based on the one or more first input values and the one or more second input values, by executing the machine learning model by the processor, a relative low frequency model for the first region;
   extrapolating, by executing the machine learning model by the processor, the first relative low frequency model to a second region of the subterranean formation, the second region being distinct from the first region;
   updating, based on the extrapolating, by executing the machine learning model by the processor, the relative low frequency model to span the first region and the second region;
   scaling, by the processor based on the well log data of the first region, the relative low frequency model;
   generating, by the processor based on the scaling, a scaled low frequency model representing one or more scaled elastic properties of the one or more formation layers of the first region and one or more formation layers of the second region; and
   performing, by the processor based on the scaled low frequency model, the seismic waveform inversion.

2. The method of claim 1, wherein extrapolating the relative low frequency model to the second region comprises recursively extrapolating the relative low frequency model to one or more additional regions of the subterranean formation.

3. The method of claim 2, wherein updating the relative low frequency model to span the first region and the second region comprises recursively updating, based on the recursive extrapolation, the relative low frequency model to span the first region, the second region, and the one or more additional regions.

4. The method of claim 1, further comprising:
   receiving, at the processor from a second seismometer, seismic data of the second region, the seismic data representing a propagation of seismic waves within the second region;
   determining, by the processor based on the received seismic data of the second region, one or more relative layer attributes of the second region, the one or more relative layer attributes of the second region representing one or more relative elastic properties of the one or more formation layers of the second region; and
   determining, by the processor based on the one or more relative layer attributes of the second region, one or more third input values for the machine learning model.

5. The method of claim 4, wherein updating the relative low frequency model to span the first region and the second region comprises updating, based on the relative low frequency model and the one or more third input values, by executing the machine learning model by the processor, the relative low frequency model to span the first region and the second region.

6. The method of claim 5, wherein the second region is void of wells.

7. The method of claim 5, further comprising measuring, by the second seismometer, the seismic data of the second region.

8. The method of claim 7, wherein the machine learning model is independent of well log data from the second region.

9. The method of claim 1, wherein determining the one or more relative layer attributes of the first region comprises transforming, by the processor, the seismic data of the first region by a −90 degree phase shift prior to determining the one or more relative layer attributes.

10. The method of claim 1, wherein the scaled low frequency model represents at least one of a density, a velocity, and an impedance for the one or more formation layers of the first region and the one or more formation layers of the second region.

11. The method of claim 1, wherein updating the relative low frequency model to span the first region and the second region comprises updating the second relative low frequency model to span the first region and the second region in entirety.

12. The method of claim 1, further comprising:
measuring, by the first seismometer, the seismic data at the first region; and
measuring, by the well log instrument, the well log data at the first region.

13. The method of claim 1, further comprising:
determining, by the processor based on the seismic inversion, one or more well sites;
drilling, by a drill, one or more wellbores at each of the one or more well sites; and
extracting, by a pump, hydrocarbons from the one or more wellbores at the one or more well sites.

14. A system of generating a low frequency model of a subterranean formation for performing a seismic waveform inversion, the system comprising:
a first seismometer operable to measure seismic data of a first region of the subterranean formation, the seismic data representing a propagation of seismic waves within the first region;
a well log instrument operable to measure well log data of one or more wells located at the first region;
a computer storing computer instructions that, when executed by a processor of the computer, cause the processor to perform operations comprising:
receiving, from the first seismometer, the seismic data for the first region;
receiving, from the well log instrument, the well log data of the one or more wells located at the first region;
determining, based on the received seismic data of the first region, one or more relative layer attributes of the first region, the one or more relative layer attributes representing one or more relative elastic properties of one or more formation layers of the first region;
determining, based on the one or more relative layer attributes of the first region, one or more first input values for a machine learning model;
determining, based on the received well log data, one or more second input values for the machine learning model;
generating, based on the one or more first input values and the one or more second input values, by executing the machine learning model, a relative low frequency model for the first region;
extrapolating, by executing the machine learning model, the relative low frequency model to a second region of the subterranean formation, the second region being distinct from the first region;
updating, based on the extrapolating, by executing the machine learning model, the relative low frequency model to span the first region and the second region;
scaling, based on the well log data of the first region, the relative low frequency model;
generating, based on the scaling, a scaled low frequency model representing one or more scaled elastic properties of the one or more formation layers of the first region and one or more formation layers of the second region; and performing, based on the scaled low frequency model, the seismic waveform inversion.

15. The system of claim 14, further comprising a second seismometer operable to measure seismic data of the second region of the subterranean formation, the seismic data representing a propagation of seismic waves within the second region.

16. The system of claim 15, wherein the computer instructions further include computer instructions that cause the processor to perform operations comprising:
receiving, from the second seismometer, the seismic data of the second region;
determining, based on the received seismic data of the second region, one or more relative layer attributes of the second region, the one or more relative layer attributes of the second region representing one or more relative elastic properties of the one or more formation layers of the second region; and
determining, based on the one or more relative layer attributes of the second region, one or more third input values for the machine learning model.

17. The system of claim 16, wherein updating the relative low frequency model to span the first region and the second region comprises updating, based on the relative low frequency model and the one or more third input values, by executing the machine learning model, the relative low frequency model to span the first region and the second region in entirety.

18. The system of claim 16, wherein the second region is void of wells.

19. A non-transitory computer-readable medium storing instructions that, when executed by at least one processor, cause the at least one processor to perform operations comprising:
receiving, from a first seismometer, seismic data for a first region of a subterranean formation, seismic data representing a propagation of seismic waves within the first region;
receiving, from a well log instrument, well log data of one or more wells located at the first region;
determining, based on the received seismic data of the first region, one or more relative layer attributes of the first region, the one or more relative layer attributes representing one or more relative elastic properties of one or more formation layers of the first region;
determining, based on the one or more relative layer attributes of the first region, one or more first input values for a machine learning model;
determining, based on the received well log data, one or more second input values for the machine learning model;
generating, based on the one or more first input values and the one or more second input values, by executing the machine learning model, a relative low frequency model for the first region;
extrapolating, by executing the machine learning model, the relative low frequency model to a second region of the subterranean formation, the second region being distinct from the first region;
updating, based on the extrapolating, by executing the machine learning model, the relative low frequency model to span the first region and the second region;
scaling, based on the well log data of the first region, the relative low frequency model;
generating, based on the scaling, a scaled low frequency model representing one or more scaled elastic properties of the one or more formation layers of the first region and one or more formation layers of the second region; and performing, based on the scaled low frequency model, seismic waveform inversion.

20. The non-transitory computer-readable medium of claim 19, wherein the computer instructions further include computer instructions that cause the at least one processor to perform operations comprising:

receiving, from a second seismometer, seismic data of the second region, the seismic data representing a propagation of seismic waves within the second region;

determining, based on the received seismic data of the second region, one or more relative layer attributes of the second region, the one or more relative layer attributes of the second region representing one or more relative elastic properties of the one or more formation layers of the second region; and determining, based on the one or more relative layer attributes of the second region, one or more third input values for the machine learning model, wherein updating the second relative low frequency model to span the first region and the second region comprises updating, based on the relative low frequency model and the one or more third input values, by executing the machine learning model, the second relative low frequency model to span the first region and the second region in entirety.

* * * * *